(12) United States Patent
Yang et al.

(10) Patent No.: US 12,301,442 B2
(45) Date of Patent: May 13, 2025

(54) METHOD AND APPARATUS FOR ESTABLISHING BORDER GATEWAY PROTOCOL BGP PEER, DEVICE, AND SYSTEM

(71) Applicant: HUAWEI TECHNOLOGIES CO., LTD., Shenzhen (CN)

(72) Inventors: Hongjie Yang, Beijing (CN); Shuanglong Chen, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/303,894

(22) Filed: Apr. 20, 2023

(65) Prior Publication Data
US 2023/0269168 A1    Aug. 24, 2023

Related U.S. Application Data

(63) Continuation of application No. PCT/CN2021/125882, filed on Oct. 22, 2021.

(30) Foreign Application Priority Data

Oct. 22, 2020    (CN) .......................... 202011135818.6
Nov. 10, 2020    (CN) .......................... 202011248641.0
Mar. 11, 2021    (CN) .......................... 202110263464.1

(51) Int. Cl.
*H04L 45/02*    (2022.01)
*H04L 69/164*    (2022.01)

(52) U.S. Cl.
CPC ............ *H04L 45/04* (2013.01); *H04L 45/026* (2013.01); *H04L 69/164* (2013.01)

(58) Field of Classification Search
CPC ...... H04L 45/026; H04L 45/04; H04L 69/164
See application file for complete search history.

(56) References Cited

U.S. PATENT DOCUMENTS

| 10,200,274 | B1 | | 2/2019 | Suryanarayana et al. | |
|---|---|---|---|---|---|
| 10,764,120 | B1 | * | 9/2020 | Means | .................... H04L 45/28 |
| 2006/0087977 | A1 | * | 4/2006 | Tatman | .................... H04L 45/04 |
| | | | | | 370/242 |

(Continued)

OTHER PUBLICATIONS

Liao et al., "The Realization of Inter-Domain Routing Protocol Based on UDP for Integrated Network", Journal of Guangxi Normal University (Nature Science Edition), China Academic Journal Electronic Publishing House, Dec. 15, 2016, vol. 34, No. 4, XP055923122, 8 pages (with partial English translation).

(Continued)

*Primary Examiner* — Mohamed A. Wasel
(74) *Attorney, Agent, or Firm* — Maier & Maier, PLLC

(57) ABSTRACT

A method and an apparatus for establishing a BGP peer, a device, and a system. A first network device sends a first packet to a second network device in a UDP manner, where the first packet is used to establish a BGP peer with the second network device; and if the first network device can receive a second packet sent by the second network device in the UDP manner, the first network device establishes a BGP peer relationship with the second network device in response to the received second packet.

20 Claims, 11 Drawing Sheets

(56) References Cited

U.S. PATENT DOCUMENTS

| | | | | |
|---|---|---|---|---|
| 2012/0120812 A1* | 5/2012 | Gerber | ............... | H04L 43/0864 |
| | | | | 370/249 |
| 2015/0207728 A1* | 7/2015 | Gagliano | ............... | H04L 45/44 |
| | | | | 370/254 |
| 2021/0360716 A1* | 11/2021 | Yang | .................. | H04L 67/1063 |

OTHER PUBLICATIONS

Rekhter et al., "A Border Gateway Protocol 4 (BGP-4)", Network Working Group, The Internet Society, Jan. 2006, 104 pages.

IETF et al., "QUIC-Communication Protocol", Wikipedia, Oct. 12, 2012, 14 pages.

* cited by examiner

| Parameter type parameter type | Parameter length parameter length | Parameter value parameter value (variable) |

METHOD AND APPARATUS FOR ESTABLISHING BORDER GATEWAY PROTOCOL BGP PEER, DEVICE, AND SYSTEM

CROSS-REFERENCE TO RELATED APPLICATIONS

This application is a continuation of International Application No. PCT/CN2021/125882, filed on Oct. 22, 2021, which claims priority to Chinese Patent Application No. 202011135818.6, filed on Oct. 22, 2020 and Chinese Patent Application No. 202011248641.0, filed on Nov. 10, 2020 and Chinese Patent Application No. 202110263464.1, filed on Mar. 11, 2021. All of the aforementioned patent applications are hereby incorporated by reference in their entireties.

TECHNICAL FIELD

The embodiments relate to the field of communication technologies, a method, and an apparatus for establishing a border gateway protocol (BGP) peer, a device, and a system.

BACKGROUND

Currently, a border gateway protocol (BGP) peer is established in a transmission control protocol (TCP) transmission manner. That is, a TCP connection needs to be first established between network devices that are to establish a BGP peer relationship, and then a BGP packet is transmitted based on the established TCP connection to establish the BGP peer. Because a process of establishing a TCP connection between network devices is complex, establishing a BGP peer between the network devices consumes a large quantity of resources, and efficiency is low.

Based on this, a solution in which a BGP peer can be quickly and conveniently established between network devices urgently needs to be provided.

SUMMARY

The embodiments may provide a method and an apparatus for establishing a BGP peer, a device, and a system. A BGP peer can be established between network devices easily and quickly in a user datagram protocol (UDP) manner without using a TCP connection.

In the embodiments, the UDP manner may include a reliability-enhanced UDP manner, or may include a quick UDP Internet connection (QUIC) manner. The reliability-enhanced UDP manner refers to a UDP manner with high reliability.

In this embodiment, a first network device and a second network device that establish a BGP peer relationship may be located in a same AS or may be located in different ASs. Whether the first network device and the second network device belong to a same AS does not affect implementation of the embodiments.

In the embodiments, the BGP peer relationship established between the first network device and the second network device may be an external border gateway protocol (EBGP) peer relationship, or may be an internal border gateway protocol (IBGP) peer relationship. Whether the BGP peer relationship established between the first network device and the second network device is EBGP or IBGP does not affect implementation of the embodiments.

According to a first aspect, an embodiment may provide a method for establishing a BGP peer. Operations performed by a first network device that establishes a BGP peer may include: sending a first packet to a second network device in a UDP manner, where the first packet is used to establish a BGP peer with the second network device. If a second packet sent by the second network device in the UDP manner can be received, where the second packet is used to establish a BGP peer with the first network device, the first network device establishes a BGP peer relationship with the second network device in response to the received second packet. In this way, when the first network device needs to establish the BGP peer with the second network device, a TCP connection between the first network device and the second network device does not need to be first established by using a complex procedure, and the BGP peer relationship between the first network device and the second network device is directly established in the UDP manner. Compared with the TCP manner, an interaction procedure is simplified, resources required for establishing the BGP peer are reduced, and efficiency of establishing the BGP peer is improved.

The first packet may be an open packet, and the open packet includes an identifier of an autonomous system (AS) to which the first network device belongs and a BGP identifier of the first network device.

In a possible implementation, the first network device stores a state machine of the BGP peer relationship, and before the first network device sends the first packet to the second network device in the UDP manner, the state machine is in an idle state. In an example, after sending the first packet to the second network device in the UDP manner, the first network device switches the state machine from the idle state to an OPEN SENT state. As another example, the first network device may alternatively send the first packet to the second network device in the UDP manner after switching the state machine from the idle state to the open sent state. As still another example, the first network device may alternatively switch the state machine from the idle state to the open sent state when sending the first packet to the second network device in the UDP manner. Occasions for switching the state machine of the first network device from the idle state to the open sent state and sending the first packet by the first network device to the second network device may not be limited. The state switching may be performed before the first packet is sent, or the state switching may be performed after the first packet is sent, or the state switching may be performed when the first packet is sent. In this way, the idle state and the open sent state in the first network device are two consecutive states in the state machine. Compared with a TCP connection-based manner, at least two intermediate states, that is, a connect state and an active state, can be omitted, thereby reducing a procedure for establishing the BGP peer relationship, and improving efficiency of establishing the BGP peer relationship.

In a possible implementation, the second packet indicates that the second network device is reachable, and the second packet may be, for example, a keepalive packet or an Update packet.

In a possible implementation, after sending the first packet to the second network device in the UDP manner, the first network device starts to wait for receiving an open packet sent by the second network device. If the first network device does not receive, within the first preset duration, a reply packet that is for the first packet and that is sent by the second network device, the first network device continues to send an open packet to the second network device in the UDP manner until the first network device receives a reply packet that is sent by the second network device in the UDP manner. In this way, the first network device periodically sends an open packet to the second network device until the first network device receives a reply packet sent by the second network device.

In a possible implementation, after sending the first packet to the second network device in the UDP manner, if the first network device receives a third packet sent by the second network device in the UDP manner, where the third packet is used to establish a BGP peer relationship with the first network device, the first network device determines whether the third packet is correct, where that the third packet is correct means that a capability that is supported by the second network device and that is indicated by the third packet and a capability that is supported by the first network device and that is indicated by the first packet have common content. The third packet may be an open packet. The open packet carries a capability supported by the sender network device. The open packet having an error means that capabilities that are supported by the first network device and the second network device and that are in the latest open packet do not intersect, and a capability supported by both the two network devices cannot be determined. For example, the open packet sent by the first network device indicates that the first network device supports an Internet Protocol version 4 (IPv4) capability. If the open packet received by the first network device indicates that the second network device supports an Internet Protocol version 6 (IPv6) capability, the first network device determines that the third packet has an error. That the open packet is correct means that capabilities that are in the latest open packet and that are supported by the first network device and the second network device intersect, and a capability supported by both the two network devices can be determined. For example, the open packet sent by the first network device indicates that the first network device supports an IPv4 capability and an IPv6 capability, and the open packet received by the first network device indicates that the second network device supports an IPv6 capability. Therefore, the first network device may determine that the BGP peer relationship established with the second network device is applicable to the IPv6 capability and may determine that the third packet is correct.

As an example, when the third packet is correct, the first network device sends a fourth packet to the second network device in the UDP manner, where the fourth packet indicates that the first network device is reachable. The fourth packet may be, for example, a Keepalive packet. In this example, when it is determined that the third packet is correct, the first network device may further switch the state machine from the open sent state to an OPEN CONFIRM state.

In this example, if before the first network device receives the second packet, it is determined that a first condition is met, the first network device switches the state machine from an open confirm state to the idle state. The first condition includes the following: The first network device receives a first Notification packet, where the first notification packet indicates that the second network device cannot establish a peer relationship with the first network device; or the first network device does not receive, within second preset duration, a keepalive packet or an Update packet sent by the second network device.

In this example, the first network device may include a timer, and duration of the timer may be the second preset duration. In this case, the first network device may restart the timer in response to the received second packet.

As another example, when the third packet has an error, the first network device may switch the state machine from the open sent state to the idle state. In addition, when the third packet has an error, the first network device may further send a second Notification packet to the second network device, where the second notification packet indicates that the first network device cannot establish a BGP peer relationship with the second network device.

It can be understood that, in this implementation, the BGP peer relationship is established between the first network device and the second network device by using the idle state, the open sent state, and the open confirm state. Compared with a manner of establishing the BGP peer relationship by using the TCP connection, a process of establishing the TCP connection between the first network device and the second network device is saved, that is, the connect state and the active state do not need to be performed, thereby greatly improving efficiency of establishing the BGP peer relationship.

In a possible implementation, the second packet may be, for example, an open packet or an Update packet.

As an example, in response to receiving the second packet, before the first network device establishes the BGP peer relationship with the second network device, the first network device may further determine whether the second packet is correct. That the second packet is correct means that a capability that is indicated by the second packet and that is supported by the second network device and a capability that is indicated by the first packet and that is supported by the first network device have matching content. When it is determined that the second packet is correct, the first network device establishes the BGP peer relationship with the second network device in response to receiving the second packet. When it is determined that the second packet has an error, the first network device switches the state machine from the open sent state to the idle state.

As an example, before receiving the second packet, if it is determined that a first condition is met, the first network device switches the state machine from the open sent state to the idle state. The first condition includes the following: The first network device receives a first Notification packet, where the first notification packet indicates that the second network device cannot establish a peer relationship with the first network device; or the network device does not receive, within third preset duration, an open packet or an Update packet sent by the second network device. In this example, the first network device may include a timer, and duration of the timer may be the third preset duration. In this case, the first network device may restart the timer in response to receiving the second packet.

It can be understood that, in this implementation, the BGP peer relationship is established between the first network device and the second network device by using the idle state and the open sent state. Compared with a manner of establishing the BGP peer relationship by using the TCP connection, a process of establishing the TCP connection between the first network device and the second network device is saved, that is, the open confirm state does not need to be performed, thereby greatly improving efficiency of establishing the BGP peer relationship.

In some possible implementations, if the first network device stores the state machine of the BGP peer relationship, that the first network device establishes the BGP peer relationship with the second network device in response to the second packet may be as follows: The first network device switches the state machine to an ESTABLISHED state, where the established state indicates that the BGP peer relationship is established between the first network device and the second network device.

As an example, after establishing the BGP peer relationship with the second network device, the first network device may further keep receiving BGP Update packets sent by the second network device, where the BGP update packet includes routing information advertised by the second network device to the first network device. In this way, the first network device may store a route corresponding to each piece of routing information, which provides a basis for communication between the first network device and the second network device.

In some possible implementations, after the first network device switches the state machine to the established state, if the first network device meets a second condition, the first network device switches the state machine from the established state to the idle state. For example, the second condition may include the following: The first network device receives a second notification packet, where the second notification packet indicates to break off the BGP peer relationship between the first network device and the second network device; or the first network device does not receive, within fourth preset duration, an update packet or a keepalive packet sent by the second network device.

In an example, after the first network device enters the idle state from the established state, the first network device may delete a route corresponding to the routing information received from the second network device. In addition, the first network device may further delete a state of a route corresponding to routing information sent by the first network device to the second network device. It should be noted that when the first network device determines that the state machine of the BGP peer relationship with the second network device enters the idle state from the established state, if a BGP peer relationship needs to be established between the first network device and the second network device, the first network device needs to perform the foregoing method provided in this embodiment when determining that a fourth condition is met, to establish the BGP peer relationship between the first network device and the second network device. The fourth condition may include the following: After the established state is switched to the idle state, preset first duration elapses, and the first network device completes deleting the route related to the second network device. In this way, after the BGP peer relationship is withdrawn between the two network devices, the BGP peer relationship can be quickly and efficiently established based on the method provided in this embodiment.

In a possible implementation, the first packet further includes a protocol type identifier, and the protocol type identifier is used to negotiate with the second network device about a transport layer protocol type for establishing a BGP peer.

According to a second aspect, an embodiment may further provide an apparatus for establishing a BGP peer. The apparatus may include a first sending unit, a first receiving unit, and an establishment unit. The first sending unit is configured to: send a first packet to a second network device in a UDP manner, where the first packet is used to establish a BGP peer with the second network device. The first receiving unit is configured to receive a second packet sent by the second network device in the UDP manner. The establishment unit is configured to establish a BGP peer relationship with the second network device in response to receiving the second packet.

In a possible implementation, the first packet is an open packet, and the open packet includes an autonomous system (AS) identifier to which the apparatus for establishing a BGP peer belongs and a BGP identifier of the apparatus for establishing a BGP peer.

As an example, the apparatus may store a state machine of the BGP peer relationship, and the apparatus further includes a setting unit and a first switching unit. The setting unit is configured to set the state machine to an idle state before the first packet is sent to the second network device in the UDP manner; and the first switching unit is configured to switch the state machine from the idle state to an OPEN SENT state after the first packet is sent to the second network device in the UDP manner.

As another example, the apparatus stores a state machine of the BGP peer relationship, and the apparatus further includes a first switching unit. The first switching unit is configured to switch the state machine from an idle state to an open sent state before the first packet is sent to the second network device in the UDP manner.

As another example, the apparatus stores a state machine of the BGP peer relationship, and the apparatus further includes a first switching unit. The first switching unit is configured to switch the state machine from an idle state to an open sent state when the first packet is sent to the second network device in the UDP manner.

In a possible implementation, the apparatus further includes a second sending unit. The second sending unit is configured to: after the first packet is sent to the second network device in the UDP manner, if no reply packet that is sent by the second network device and that is for the first packet is received within first preset duration, send an open packet to the second network device in the UDP manner.

In a possible implementation, the apparatus further includes a second receiving unit and a determining unit. The second receiving unit is configured to: after the first packet is sent to the second network device in the UDP manner, receive a third packet sent by the second network device in the UDP manner, where the third packet is used to establish a BGP peer relationship with the apparatus for establishing a BGP peer. The determining unit is configured to determine whether the third packet is correct, where that the third packet is correct means that a capability that is supported by the second network device and that is indicated by the third packet and a capability that is supported by the apparatus for establishing a BGP peer and that is indicated by the first packet have common content.

The third packet is an open packet.

In a possible implementation, the apparatus further includes a fourth sending unit. The fourth sending unit is configured to: send a fourth packet to the second network device in the UDP manner when the third packet is correct, where the fourth packet indicates that the apparatus for establishing a BGP peer is reachable.

The fourth packet is a Keepalive packet.

In a possible implementation, the apparatus stores a state machine of the BGP peer relationship, and the apparatus further includes a second switching unit. The second switching unit is configured to: when the third packet is correct, switch the state machine from the open sent state to an OPEN CONFIRM state.

In a possible implementation, the apparatus further includes a third switching unit. The third switching unit is configured to: before the second packet is received, switch the state machine from an open confirm state to the idle state when a first condition is met. The first condition includes the following: The apparatus for establishing a BGP peer receives a first Notification packet, where the first notification packet indicates that the second network device cannot establish a peer relationship with the apparatus for establishing a BGP peer; or the apparatus for establishing a BGP peer does not receive, within second preset duration, a keepalive packet or an Update packet sent by the second network device.

In a possible implementation, the apparatus includes a timer, duration of the timer is the second preset duration, and the apparatus further includes a first restarting unit. The first restarting unit is configured to restart the timer by the apparatus for establishing a BGP peer in response to receiving the second packet.

In a possible implementation, the apparatus stores a state machine, and the apparatus further includes a fourth switching unit. The fourth switching unit is configured to switch the state machine from the open sent state to the idle state when the third packet has an error.

In a possible implementation, the apparatus further includes a fifth sending unit. The fifth sending unit is configured to: send a second Notification packet to the second network device when the third packet has an error, where the second notification packet indicates that the apparatus for establishing a BGP peer cannot establish a BGP peer relationship with the second network device.

The second packet indicates that the second network device is reachable, and the second packet is a keepalive packet or an Update packet.

Alternatively, the second packet is an open packet or an Update packet.

As an example, the determining unit of the apparatus is further configured to: before the BGP peer relationship with the second network device is established, determine whether the second packet is correct, where that the second packet is correct means that a capability that is supported by the second network device and that is indicated by the second packet and a capability that is supported by the first network device and that is indicated by the first packet have matching content. In this case, when the determining unit determines that the second packet is correct, the establishment unit is triggered to establish the BGP peer relationship with the second network device in response to receiving the second packet. When the determining unit determines that the second packet has an error, the fifth switching unit of the apparatus is configured to switch the state machine from the open sent state to the idle state.

In a possible implementation, the apparatus further includes a sixth switching unit. The sixth switching unit is configured to: before the second packet is received, switch the state machine from the open sent state to the idle state when a first condition is met. The first condition includes the following: The apparatus for establishing a BGP peer receives a first Notification packet, where the first notification packet indicates that the second network device cannot establish a peer relationship with the apparatus for establishing a BGP peer; or the apparatus for establishing a BGP peer does not receive, within third preset duration, an open packet or an Update packet sent by the second network device.

In a possible implementation, the apparatus includes a timer, duration of the timer is the third preset duration, and the apparatus further includes a second restarting unit. The second restarting unit is configured to restart the timer in response to receiving the second packet.

In a possible implementation, the apparatus stores a state machine of the BGP peer relationship. In this case, the establishment unit may be configured to: switch the state machine to the ESTABLISHED state, where the established state indicates that a BGP peer relationship is established between the apparatus for establishing a BGP peer and the second network device.

In a possible implementation, the apparatus further includes a third receiving unit. The third receiving unit is configured to: after the BGP peer relationship with the second network device is established, receive a BGP Update packet sent by the second network device, where the BGP update packet includes routing information advertised by the second network device to the apparatus for establishing a BGP peer.

In a possible implementation, the apparatus further includes a sixth switching unit. The sixth switching unit is configured to: after the state machine is switched to the established state, switch the state machine from the established state to the idle state when a second condition is met. The second condition includes the following: The apparatus for establishing a BGP peer receives a second notification packet, where the second notification packet indicates to break off the BGP peer relationship between the apparatus for establishing a BGP peer and the second network device; or the apparatus for establishing a BGP peer does not receive, within fourth preset duration, an update packet or a keepalive packet sent by the second network device.

In a possible implementation, the apparatus further includes a deleting unit. The deletion unit is configured to: after the idle state is entered from the established state, delete a route corresponding to the routing information received from the second network device.

It should be noted that the foregoing units having a same function but different sequence numbers in names may be units that can implement the function. For example, the first sending unit and the second sending unit may be a same unit having a sending function.

It should be noted that the apparatus for establishing a BGP peer provided in the second aspect is configured to perform the related operation mentioned in the first aspect. For an implementation and an achieved effect of the apparatus, refer to the related description of the first aspect. Details are not described herein again.

According to a third aspect, an embodiment may further provide a network device, including a memory and a processor. The memory is configured to store program code or instructions. The processor is configured to run the program code or the instructions, so that the network device performs the method provided in the first aspect.

According to a fourth aspect, an embodiment may further provide a non-transitory computer-readable storage medium. The non-transitory computer-readable storage medium stores program code or instructions. When the program code or the instructions are run on a computer, the computer is enabled to perform the method provided in any one of the possible implementations of the first aspect.

According to a fifth aspect, an embodiment may further provide a computer program product. When the computer program product runs on a network device, the network device is enabled to perform the method in any one of the possible implementations of the first aspect.

According to a sixth aspect, the embodiments may provide a network device. The network device includes: a main control board and an interface board. The main control board includes: a first processor and a first memory. The interface board includes: a second processor, a second memory, and an interface card. The main control board and the interface board are coupled.

The first memory may be configured to store program code. The first processor is configured to invoke the program code in the first memory to perform the following operation: in response to receiving a second packet, establishing a BGP peer relationship with a second network device.

The second memory may be configured to store program code. The second processor is configured to invoke the program code in the second memory, to trigger the interface card to perform the following operations: sending a first packet to the second network device in a user datagram protocol (UDP) manner, where the first packet is used to establish a BGP peer with the second network device; and receiving a second packet sent by the second network device in the UDP manner.

In a possible implementation, an inter-process communication (IPC) channel is established between the main control board and the interface board, and the main control board and the interface board communicate with each other through the IPC channel.

According to a seventh aspect, a computer program is provided. The computer program includes computer instructions, and the computer instructions are stored in a computer-readable storage medium. A processor of a network device reads the computer instructions from the computer-readable storage medium, and the processor executes the computer instructions, to enable the network device to perform the method provided in the first aspect.

According to an eighth aspect, the embodiments may provide a chip, including a memory and a processor. The memory is configured to store a computer program, and the processor is configured to invoke the computer program from the memory and run the computer program, to perform the method in the first aspect.

Optionally, the chip includes only a processor. The processor is configured to read and execute a computer program stored in a memory. When the computer program is executed, the processor performs the method in the first aspect.

According to a ninth aspect, an embodiment may further provide a network system, where the network system may include a first network device and a second network device. The first network device is configured to send a first packet to the second network device in a UDP manner, where the first packet is used to establish a BGP peer with the second network device. The second network device is configured to: receive the first packet and send a second packet to the first network device in the UDP manner, where the second packet is used to establish a BGP peer with the first network device. In this case, the first network device is further configured to: establish a BGP peer relationship with the second network device in response to receiving the second packet.

BRIEF DESCRIPTION OF THE DRAWINGS

To describe the embodiments more clearly, the following briefly describes the accompanying drawings. It is clear that the accompanying drawings in the following descriptions show merely some embodiments and a person of ordinary skill in the art may derive other drawings from these accompanying drawings.

DETAILED DESCRIPTION OF THE EMBODIMENTS

Currently, a border gateway protocol (BGP) peer relationship may be established between network devices based on a process specified in Request For Comments (RFC) 4271, that is, the BGP peer relationship between the network devices is established based on a TCP connection.

Figure 1:
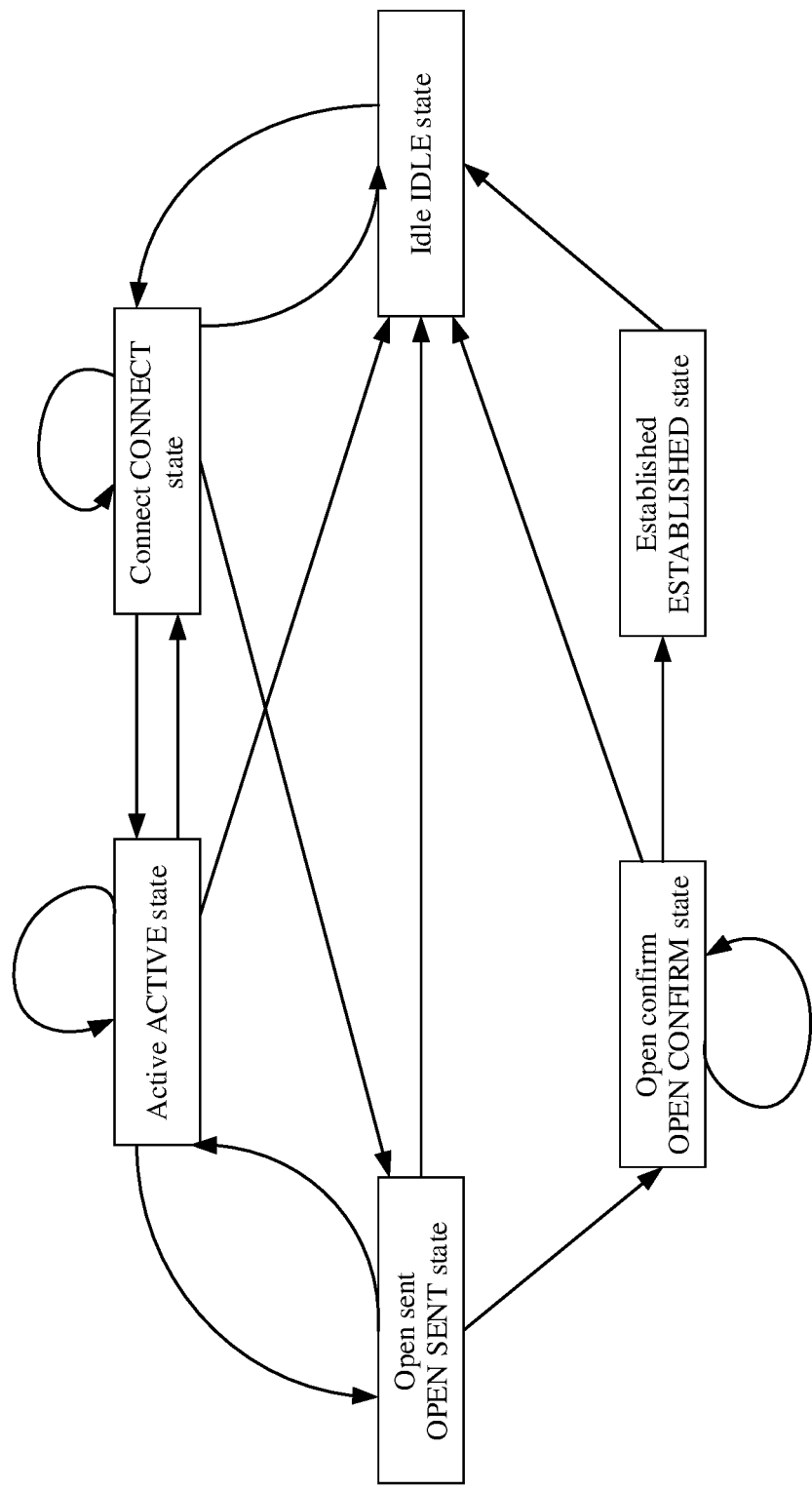
FIG. 1 is a schematic diagram of a status of establishing a BGP peer based on RFC 4271 according to an embodiment.

As specified in RFC 4271, in a process of establishing a BGP peer, a network device stores a state machine (SM) of a BGP peer relationship. As shown in FIG. 1, the state machine may include the following six states: an idle state, a connect state, an active state, an open sent state, an open confirm state, and an established state.

Figure 2:
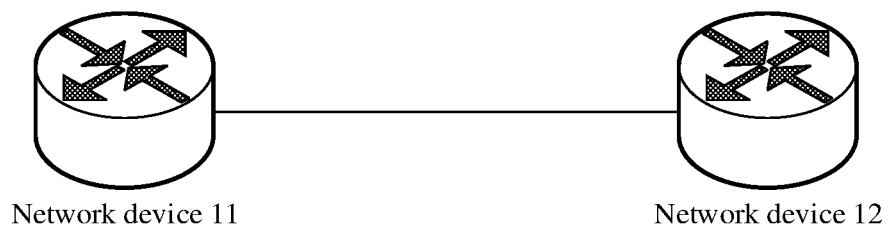
FIG. 2 is a schematic diagram of a structure of a scenario according to an embodiment.
Figure 3:
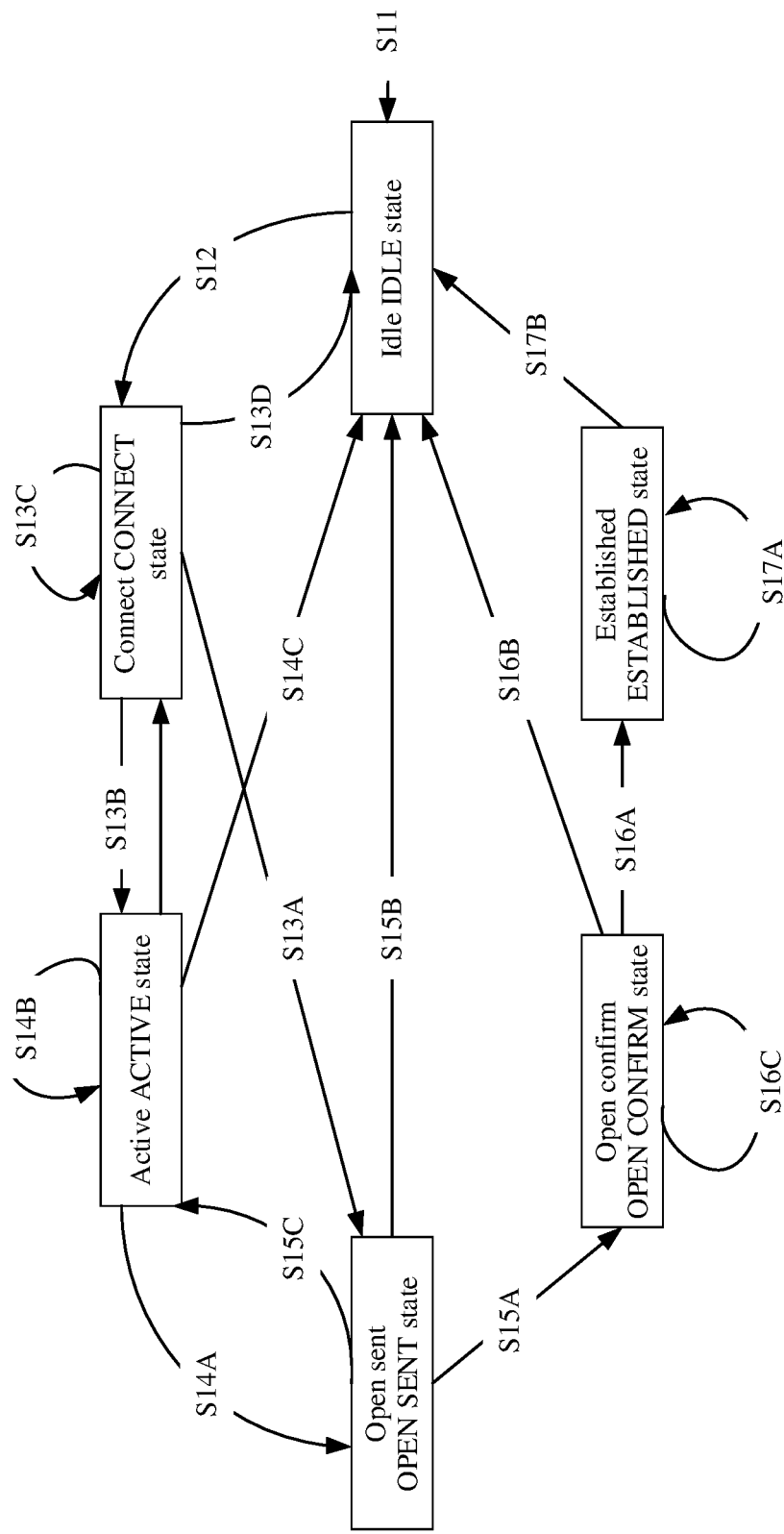
FIG. 3 is a schematic flowchart of establishing a BGP peer based on RFC 4271 according to an embodiment.

For example, it is assumed that in the scenario shown in FIG. 2, a BGP peer needs to be established between a network device 11 and a network device 12. Because processing logic and processing procedures of the network device 11 and the network device 12 in each state are consistent, in FIG. 3, the network device 11 is used as an example to describe operations performed by each network device in a process of establishing the BGP peer relationship between the network device 11 and the network device 12 based on RFC 4271. As shown in FIG. 3, operations performed by the network device 11 when the network device 11 establishes a BGP peer with the second network device may include, for example, the following steps:

S11: The network device 11 completes BGP configuration, and a state machine of the BGP peer relationship enters an idle state, and a timer 1 is started.

The completing BGP configuration may refer to configuring a BGP-related command, enabling a BGP function, and applying for a BGP resource, and may refer to configuring the network device 11 to establish the BGP peer relationship with the network device 12.

S12: From a moment at which the timer 1 expires, the state machine of the BGP peer relationship enters a connect state, and the network device 11 starts a timer 2, starts to send a TCP connection message to the network device 12, and waits for receiving a TCP message that is sent by the network device 12 and that indicates that the TCP connection succeeds.

S13: When the state machine is the connect state, if the TCP connection is successful, the state machine of the BGP peer relationship enters an open sent state, and S15 (marked as S13A in the figure) is performed. If the TCP connection fails, the state machine of the BGP peer relationship enters an active state, and a timer 3 is started, and S14 (marked as S13B in the figure) is performed. If the timer 2 expires, the state machine remains in the connect state (marked as S13C in the figure). If an error occurs (for example, a message indicating that the BGP peer relationship between the network device 11 and the network device 12 is withdrawn is received, or a message indicating that the BGP configuration needs to be updated is received), back to the idle state (marked as S13D in the figure).

S14: When the state machine is in the active state, if the TCP connection is successful, the state machine of the BGP peer relationship enters the open sent state, and S15 (marked as S14A in the figure) is performed. If the TCP connection fails, the state machine remains in the active state (marked as S14B in the figure). If the timer 3 expires, back to the connect state. If an exception occurs, back to the idle state (marked as S14C in the figure).

S15: When the state machine of the BGP peer relationship enters the open sent state, the network device 11 sends an open packet 1 to the network device 12 and starts to wait for receiving an open packet 2 sent by the network device 12. If an open packet 2 without an error is received, the state machine of the BGP peer relationship enters an open confirm state, and the following S16 (marked as S15A in the figure) is performed. If an open packet 2 in which an error occurs is received, a notification packet used to indicate that an exception occurs in the BGP peer relationship between the network device 11 and the network device 12 is sent to the network device 12, and back to the idle state (marked as S15B in the figure). If the TCP connection is interrupted, back to the active state (marked as S15C in the figure).

Whether the open packet 2 has an error means whether a capability that is supported by the network device 12 and that is indicated by the open packet 2 and a capability that is supported by the network device 11 and that is indicated by the open packet 1 have an intersection. If the intersection exists, it indicates that the network device 11 and the network device 12 may use a common capability in the intersection to establish the BGP peer relationship, and it may be considered that the open packet 2 has no error. If the intersection does not exist, it indicates that the network device 11 and the network device 12 do not use a same capability to establish the BGP peer relationship, and it may be considered that the open packet 2 has an error.

S16: When the state machine of the BGP peer relationship enters the open confirm state, the network device 11 sends a Keepalive packet 1 to the network device 12, starts a timer 4 (for example, 10 seconds), starts to wait for receiving a keepalive packet 2 or an Update packet sent by the network device 12, and resets a timer 5 (for example, 30 seconds). If the keepalive packet 2 or the update packet is received before the timer 5 expires, the timer 5 is restarted and the established state is entered, and the following S17 (marked as S16A in the figure) is performed. If the timer 5 expires or a notification packet sent by the network device 12 is received, back to the idle state (marked as S16B in the figure). If the timer 4 expires, a keepalive packet 3 is sent to the network device 12, the timer 4 is restarted, and the open confirm state is maintained (marked as S16C in the figure).

S17: When the state machine is in the established state, it is determined that a BGP peer relationship is established between the network device 11 and the network device 12, and the network device 11 and the network device 12 may start to implement mutual route advertisement by using an update packet (marked as S17A in the figure); and after the BGP peer relationship between the network device 11 and the network device 12 enters the established state, if the network device 11 receives a notification packet indicating to close the BGP peer relationship or a notification packet indicating that the BGP peer relationship is abnormal, or the timer 5 expires, back to the idle state (marked as S17B in the figure).

In this way, the BGP peer relationship between network devices can be established by switching the state machine including the six states. However, in this method for establishing a BGP peer relationship, a TCP connection needs to be first established between network devices that are to establish a BGP peer relationship, and then a BGP peer relationship is established based on the TCP connection. Because a TCP establishment process is complex, a problem of a complex process and low efficiency exists in establishing a BGP peer in this manner.

Based on this, an embodiment may provide a method for establishing a BGP peer in a UDP manner. In the method, a first network device sends, to a second network device in the UDP manner, a first packet used to establish a BGP peer with the second network device, and then the first network device receives a second packet sent by the second network device in the UDP manner. In this case, in response to the second packet, the first network device may establish a BGP peer relationship with the second network device. In this way, when the first network device needs to establish the BGP peer with the second network device, a TCP connection between the first network device and the second network device does not need to be first established by using a complex procedure, and the BGP peer relationship between the first network device and the second network device can be directly established by exchanging a few packets in the UDP manner. This reduces resources required for establishing the BGP peer and improves efficiency of establishing the BGP peer.

It should be noted that in this embodiment, a network device is a device such as a router, a switch, or a firewall that needs to establish a BGP peer.

With reference to the accompanying drawings, the following describes in detail an implementation of the method for establishing a BGP peer according to an embodiment by using embodiments.

It should be noted that the first network device may establish BGP peer relationships with a plurality of network devices in batches. However, a process of establishing a BGP peer relationship with each network device is independent of each other and does not affect each other. Therefore, in this embodiment, a process of establishing a BGP peer relationship between the first network device and a second network device in the plurality of network devices is used as an example for description. A process of establishing a BGP peer relationship with another network device is similar to the process of establishing a BGP peer relationship between the first network device and the second network device. For implementation, refer to the process of establishing a BGP peer relationship between the first network device and the second network device.

The open packet, the keepalive packet, the update packet, and the notification packet mentioned in the following embodiment are four types of BGP packets. The open packet is a first packet that needs to be sent when a BGP peer is established and is used to negotiate whether a capability that is available at both ends exists between two network devices for which a BGP peer relationship is to be established. The keepalive packet is periodically sent from a network device to a peer device to determine validity of communication between the two devices. The update packet may be used to exchange routes between network devices that have established a BGP peer relationship. The update packet can be used to advertise reachable routes or withdraw unreachable routes. The notification packet is a packet sent to the peer end when an exception is detected, a BGP peer relationship that is being established needs to be closed, or an established BGP peer relationship needs to be closed. A network device that receives the notification packet disconnects the BGP connection with the sender network device and returns to the idle state. For detailed descriptions of the foregoing four packet types, refer to related descriptions in RFC 4271. In the following embodiment, a packet used to establish the BGP peer may include an open packet, a keepalive packet, or an update packet. The keepalive packet or the update packet may be further used to indicate reachability of the network device.

Figure 4:
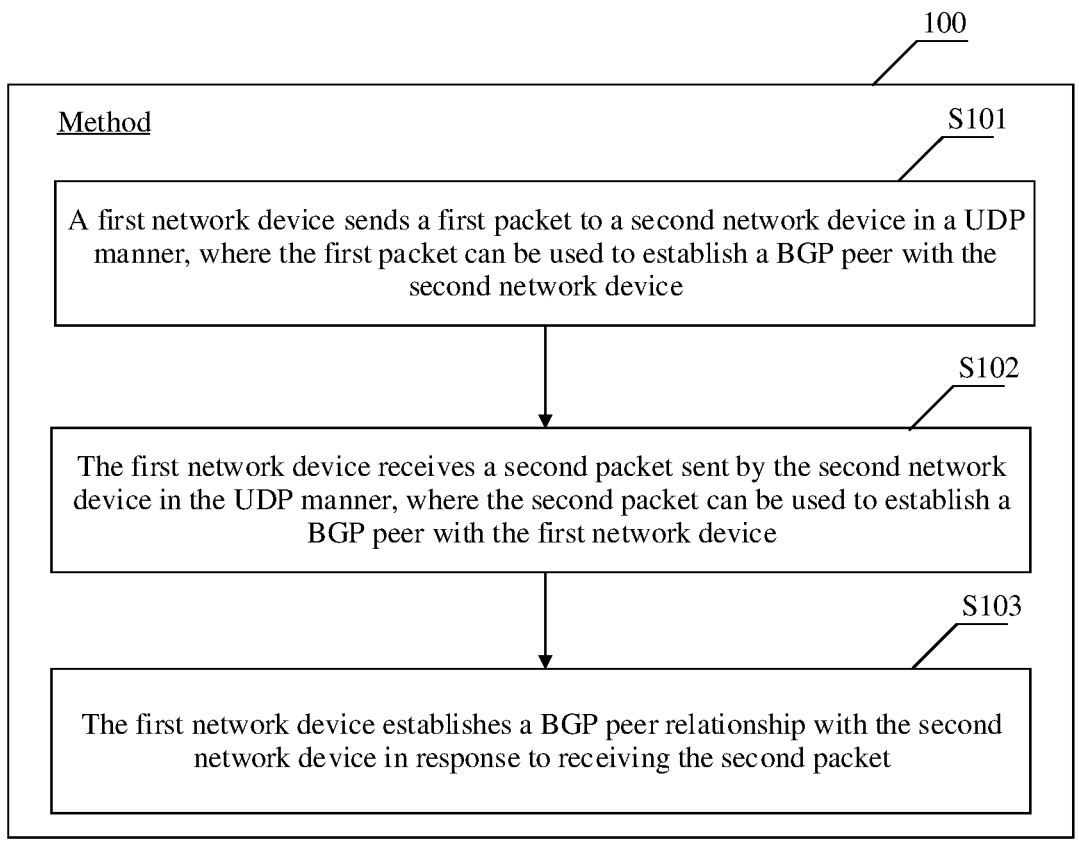
FIG. 4 is a schematic flowchart of a method 100 for establishing a BGP peer according to an embodiment.

FIG. 4 is a schematic flowchart of a method 100 for establishing a BGP peer according to an embodiment. Refer to FIG. 4. The method 100 is applied to a first network device, to establish a BGP peer relationship between the first network device and a second network device. For example, the method 100 may be applied to the network device 11 shown in FIG. 2. In this case, the second network device in the method 100 may be the network device 12 in FIG. 2. For another example, the method 100 may be applied to the network device 12 shown in FIG. 2. In this case, the second network device in the method 100 may be the network device 11 in FIG. 2.

In this embodiment, the first network device and the second network device may be located in a same autonomous system (AS), or the first network device and the second network device may be located in different Ass. Whether the first network device and the second network device belong to a same AS does not affect implementation of this embodiment.

The BGP peer relationship established between the first network device and the second network device may be an external border gateway protocol (EBGP) peer relationship or may be an internal border gateway protocol (IBGP) peer relationship. Whether the BGP peer relationship established between the first network device and the second network device is EBGP or IBGP does not affect implementation of this embodiment.

During implementation, the method 100 may include, for example, the following S101 to S103.

S101: A first network device sends a first packet to a second network device in a UDP manner, where the first packet is used to establish a BGP peer with the second network device.

Compared with TCP, UDP is more lightweight and has higher processing efficiency. Therefore, to improve efficiency and a process of establishing a BGP peer relationship, the BGP peer relationship may be established based on UDP. In addition, to improve reliability of establishing a BGP peer in the UDP manner, the UDP manner in this embodiment may include a reliability-enhanced UDP manner, for example, a quick UDP Internet connection (QUIC) manner.

The QUIC is a UDP-based low-latency Internet transport layer protocol and may be a UDP manner. The QUIC inherits an advantage of efficiency of a conventional UDP manner, and combines features of protocols such as the TCP, the transport layer security (TLS) Protocol, and the hypertext transfer protocol version 2 (HTTP/2), thereby greatly improving security and reliability of the conventional UDP manner.

It should be noted that, regardless of whether the conventional UDP manner or the reliability-enhanced UDP manner is used, a procedure of implementing the method 100 provided in this embodiment is not affected. Compared with implementing a BGP peer established in the method 100 by using the conventional UDP manner, the BGP peer established in the method 100 by using the reliability-enhanced UDP manner is more reliable and secure. The UDP manner in the following sections covers the conventional UDP manner and the reliability-enhanced UDP manner.

Figure 5:
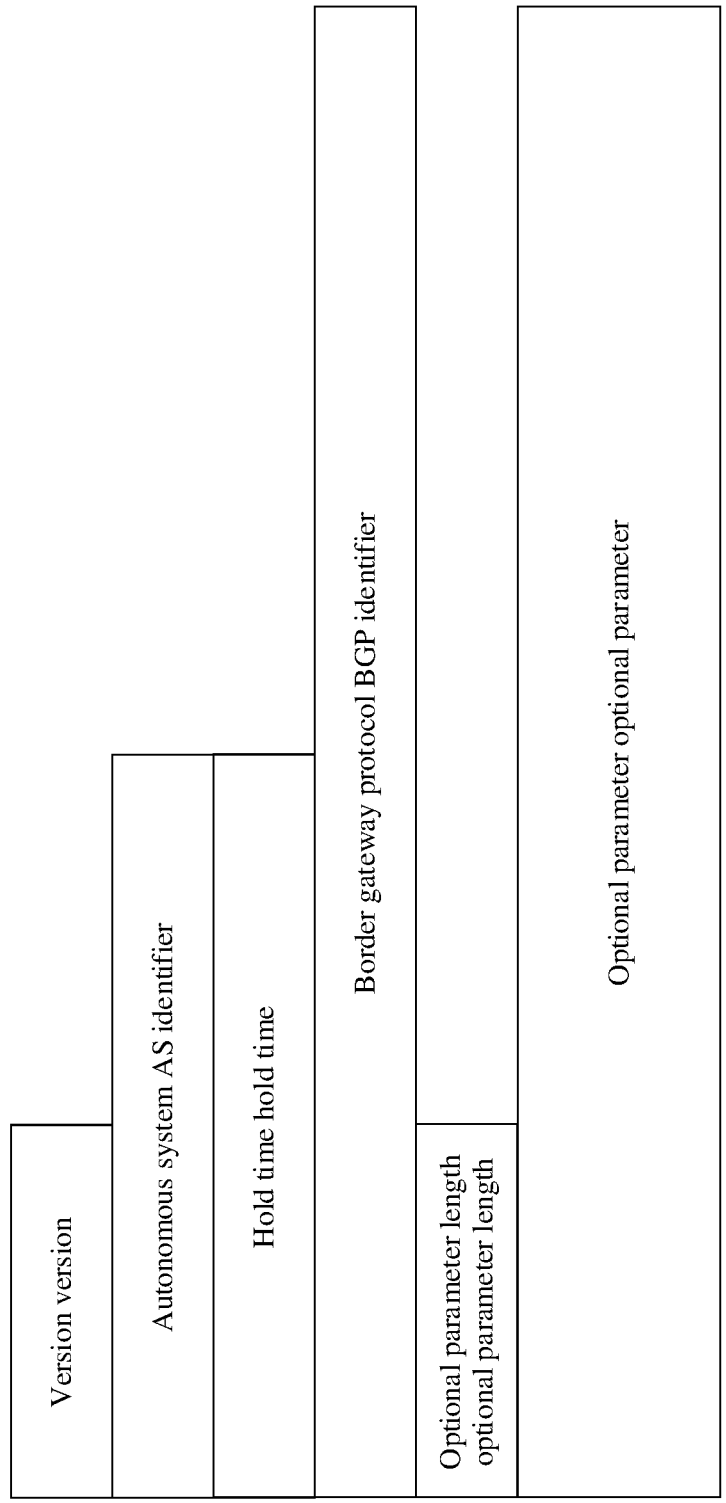
FIG. 5 is a schematic diagram of a structure of an open packet according to an embodiment.

The first packet may be an open packet, and the open packet may include at least an AS identifier and a BGP identifier. The AS identifier indicates an AS to which the first network device sending the open packet belongs, and the BGP identifier indicates an Internet Protocol (IP) address allocated when the first network device is started. For a structure of the open packet, refer to FIG. 5. The open packet may include a version field, an AS identifier field, a hold time field, a BGP identifier field, an optional parameter length field, and an optional parameter field. For meanings and lengths of the fields, refer to RFC 4271. Details are not described herein again.

In the method 100 provided in this embodiment, the TCP connection does not need to be established between the first network device and the second network device. Therefore, the TCP connection between the first network device and the second network device is not established. Compared with the six states included in the state machine of the network device in the process shown in FIG. 1 of establishing a BGP peer based on a TCP connection, the connect state and the active state that are related to establishing the TCP connection between the network devices are reduced. In this way, the BGP peer establishment process provided in this embodiment is faster and more efficient. In a scenario in which networking is increasingly complex, resources consumed for network deployment can be greatly reduced, and network deployment efficiency can be improved.

In some possible implementations, in a process of establishing a BGP peer, the first network device and the second network device may further negotiate, by using an open packet, a type of a transport layer protocol used for establishing the BGP peer. Optionally, the open packet is extended, and a description of a transport layer protocol type supported by the local device is added to the foregoing optional parameter field. The transport layer protocol type is, for example, a TCP or a QUIC protocol. For a structure of the optional parameter field, refer to FIG. 13. The optional parameter field may include a parameter type field, a parameter length field, and a parameter value field. For example, when a value of the parameter value field is 0, it indicates that a transport layer protocol type that is used to establish a BGP peer and that is supported by the local end is TCP; when a value of the parameter value field is 1, it indicates that a transport layer protocol type that is used to establish a BGP peer and that is supported by the local end is QUIC; and when a value of the parameter value field is 2, it indicates that a transport layer protocol type that is used to establish a BGP peer and that is supported by the local end is TCP and QUIC. For example, the first network device sends an open packet to the second network device, and an optional parameter field describes a transport layer protocol type that is used for establishing a BGP peer and that is supported by the first network device as QUIC. The second network device also sends an open packet to the first network device, and the optional parameter field describes a transport layer protocol type that is used for establishing a BGP peer and that is supported by the second network device as QUIC. In this case, the BGP peer relationship may be established between the first network device and the second network device based on the QUIC protocol. For another example, the first network device sends an open packet to the second network device, and an optional parameter field describes a transport layer protocol type that is used to establish a BGP peer and that is supported by the first network device as QUIC, but the second network device does not support establishment of a BGP peer by using the QUIC protocol. In this case, the second network device does not respond to the open packet that is based on the QUIC protocol, and the BGP peer relationship cannot be established between the first network device and the second network device based on the QUIC protocol. Optionally, in this case, the BGP peer relationship may still be established between the first network device and the second network device based on another transport layer protocol, for example, the TCP protocol.

In some possible implementations, before S101, the method 100 may further include the following step: S10a: The state machine of the BGP peer relationship of the first network device enters an idle state. In the idle state, the BGP state machine attempts to establish the BGP peer relationship by listening to and receiving a QUIC connection. S10a may be that the first network device completes the BGP configuration. The completing BGP configuration may include: enabling a BGP function, applying for a BGP resource, and specifying the network device 11 to establish the BGP peer relationship with the network device 12.

When the BGP peer relationship between the first network device and the second network device enters the idle state, another operation may further need to be performed, for example, completing another related configuration, for another example, clearing a stored route related to the second network device. Therefore, after S10a, S101 is triggered only when a trigger condition is further met. In one case, the trigger condition may be manually configured. For example, a trigger command is manually added after a command of another related configuration, and the trigger command indicates to trigger execution of S101 after the command of the another related configuration is executed (that is, the another related configuration is completed). For another example, after switching from an established state to the idle state, a trigger operation is manually configured after the stored route about the second network device is cleared. A condition for performing the trigger operation may be that the stored route about the second network device is cleared, and when the stored route about the second network device is cleared, the trigger operation is performed (that is, S101 is triggered). In another case, the trigger condition may be automatically implemented. For example, automatic execution of S101 is implemented by using a timer. For example, when the first network device determines that the state machine of the BGP peer relationship enters the idle state for the first time or is switched from the established state to the idle state, a timer 1 whose duration is 2 seconds is started. When the timer 1 expires, it is considered by default that the first network device completes preparation (that is, the trigger condition is met), and S101 is triggered. It should be noted that, in this embodiment, the trigger condition for triggering S101 after S10a is not limited. The foregoing description is merely an example.

In this embodiment, occasions for switching the state machine of the first network device from the idle state to an open sent state and sending the first packet by the first network device to the second network device are not limited. State switching may be performed before the first packet is sent, state switching may be performed after the first packet is sent, or state switching may be performed when the first packet is sent. In the open sent state, the BGP state machine waits for receiving the open packet sent by the BGP peer.

In an example, after S10a and before S101, the method may further include the following step: The first network device switches the state machine from the idle state to the open sent state. In this case, S101 may be as follows: After the state machine of the first network device is in the open sent state, the first network device sends the first packet to the second network device in the UDP manner.

In another example, after S10a, the method may further include the following step: The first network device switches the state machine from the idle state to the open sent state when sending the first packet to the second network device in the UDP manner. That is, the state machine of the first network device is switched to the open sent state when S101 is performed.

In still another example, after S101, the method may further include the following step: The first network device switches the state machine from the idle state to the open sent state. In this case, the first network device may first send the first packet, and then switch the state machine to the open sent state.

After sending the first open packet to the second network device in the UDP manner, the first network device may start to wait for receiving the open packet sent by the second network device. It should be noted that, a status of the BGP peer relationship between the first network device and the second network device may not be completely synchronized. Therefore, before S101, the first network device receives, in the UDP manner, the open packet sent by the second network device. However, to avoid that a capability that is supported by the second network device and that is indicated by the plurality of open packets sent by the second network device changes, and consequently an abnormal BGP peer relationship is established based on the open packet received before the first network device sends the first packet, the first network device may discard the received open packet before sending the first packet, and establish the BGP peer by using the open packet received after the first network device sends the first packet, to ensure that a capability supported in both the latest configurations of the first network device and the second network device is used when the BGP peer relationship is established between the two ends, thereby ensuring that the BGP peer relationship established between the first network device and the second network device is normal. Alternatively, to establish the BGP peer relationship more quickly, when the first network device sends the first packet, the first network device may establish the BGP peer by using a stored latest received open packet, without waiting for receiving a new open packet.

After determining that the BGP peer relationship between the first network device and the second network device enters the open sent state, the first network device may wait for receiving the open packet sent by the second network device in the UDP manner.

If the first network device does not receive the open packet sent by the second network device in the UDP manner after first preset duration from a moment at which the first network device determines that the first network device enters the open sent state, it may be determined that the first network device does not receive a reply packet of the first packet within the first preset duration. In this case, the first network device remains in the open sent state and continues to send an open packet to the second network device in the UDP manner. The first preset duration may be implemented by using a timer. For example, when the first network device determines that the open sent state of the BGP peer relationship between the first network device and the second network device is entered, the first network device starts a timer 2 whose duration is 5 seconds. If the open packet sent by the second network device in the UDP manner is still not received at a moment at which the timer 2 expires, the first network device restarts the timer 2 (that is, resets the timer 2) at the moment at which the timer 2 expires, and the first network device remains in the open sent state, and continues to send the open packet to the second network device in the UDP manner.

For an implementation of receiving, when the state machine of the first network device is in the open sent state, the reply packet that is for the first packet and that is sent by the second network device in the UDP manner, refer to the following related description.

S102: The first network device receives a second packet sent by the second network device in the UDP manner, where the second packet is used to establish a BGP peer with the first network device.

S103: The first network device establishes the BGP peer relationship with the second network device in response to receiving the second packet.

During implementation, when sending the first packet to the second network device in the UDP manner and receiving the second packet sent by the second network device in the UDP manner, the first network device may establish the BGP peer relationship between the first network device and the second network device. This provides a simple and fast implementation for establishing the BGP peer relationship between the two network devices.

Figure 6:
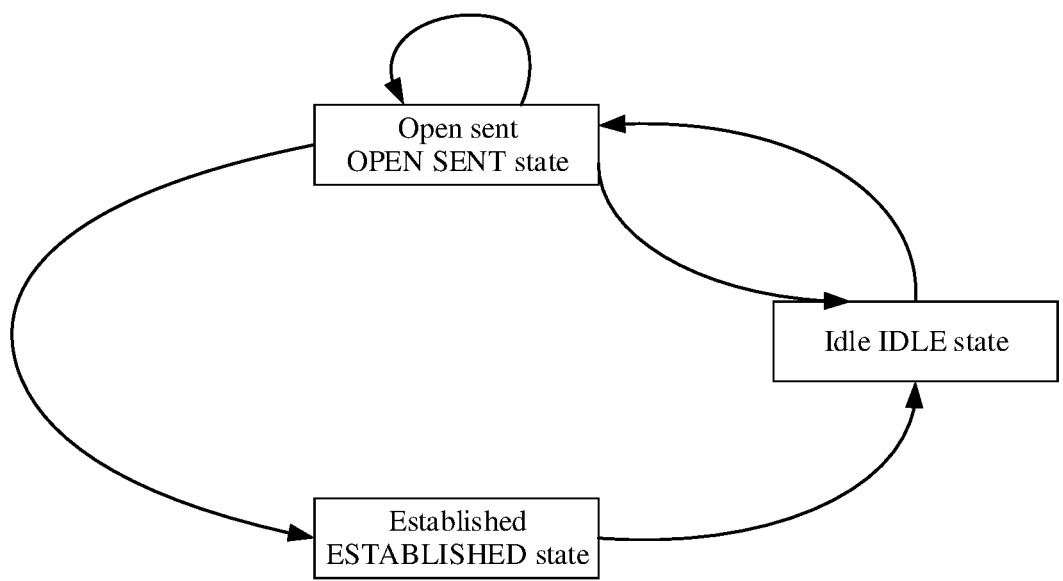
FIG. 6 is a schematic diagram of establishing a state machine of a BGP peer according to an embodiment.

The first network device may include a state machine shown in FIG. 6. The state machine includes the following three states: an idle state, an open sent state, and an established state. In this case, for related descriptions of S102 in the method 100 provided in this embodiment, refer to the following first possible implementation. Alternatively, the first network device may include a state machine shown in FIG. 7. The state machine includes the following four states: an idle state, an open sent state, an open confirm state, and an established state. In this case, for related descriptions of S102 in the method 100 provided in this embodiment, refer to the following second possible implementation.

In a first possible implementation, for a case in which both the first network device and the second network device include the state machine shown in FIG. 6, related descriptions before S103 is performed are as follows:

After S101, when the state machine of the BGP peer relationship is in the open sent state, if the first network device receives the second packet sent by the second network device in the UDP manner, where the second packet may be, for example, an open packet or an update packet, S103 may be performed.

Before S102, the method 100 may include the following step: When the first network device determines that a first condition is met, the first network device determines that the state machine of the BGP peer relationship enters the idle state from the open sent state, where the first condition may include the following: The first network device receives a notification packet sent by the second network device, where the notification packet indicates that the second network device cannot establish a peer relationship with the first network device; or the first network device does not receive, within third preset duration, an update packet or an open packet sent by the second network device. That the first network device determines that no update packet or open packet sent by the second network device is received within the third preset duration when the state machine of the BGP peer relationship enters the open sent state may be implemented by using a timer 4. Duration of the timer 4 is the third preset duration. For example, the first network device includes the timer 4. When the state machine of the BGP peer relationship enters the open sent state, the timer 4 whose duration is 20 seconds is started. Before the timer 4 expires, when the first network device receives the update packet or the open packet sent by the second network device, the timer 4 is restarted. When the timer 4 expires but the update packet or the open packet sent by the second network device is not received, it is considered that the first network device meets the first condition, and the first network device determines that the state machine of the BGP peer relationship enters the idle state from the open sent state.

In an example, if the second packet is an open packet, the first network device may determine, between S102 and S103, whether the second packet is correct. When the first network device determines that the second packet is correct, the first network device may perform S103. When the first network device determines that the second packet has an error, the first network device determines that the state machine of the BGP peer relationship enters the idle state from the open sent state. In addition, the first network device may further send a notification packet to the second network device, so that the second network device learns that the UDP manner between the first network device and the second network device is abnormal.

The open packet carries a capability supported by the sender network device. The open packet having an error means that capabilities that are supported by the first network device and the second network device and that are in the latest open packet do not intersect, and a capability supported by both the two network devices cannot be determined. For example, the open packet sent by the first network device indicates that the first network device supports an Internet Protocol version 4 (Ipv4) capability, and the open packet received by the first network device indicates that the second network device supports an Internet Protocol version 6 (Ipv6) capability. Therefore, the first network device determines that the second packet has an error. That the open packet is correct means that capabilities that are in the latest open packet and that are supported by the first network device and the second network device intersect, and a capability supported by both the two network devices can be determined. For example, the open packet sent by the first network device indicates that the first network device supports an Ipv4 capability and an Ipv6 capability, and the open packet received by the first network device indicates that the second network device supports an Ipv6 capability. Therefore, the first network device may determine that the BGP peer relationship established with the second network device is applicable to the Ipv6 capability and may determine that the second packet is correct.

In a second possible implementation, for a case in which both the first network device and the second network device include the state machine shown in FIG. 7, related descriptions before S103 is performed are as follows:

After S101, when the state machine of the BGP peer relationship is in the open sent state, if the first network device receives a third packet sent by the second network device in the UDP manner, the first network device may determine whether the third packet is correct. A determining manner is the same as a manner of determining whether the second packet is correct in the foregoing implementation, and details are not described herein again. Optionally, the third packet is an open packet.

When the first network device determines that the third packet is correct, the first network device may send a fourth packet to the second network device in the UDP manner. The fourth packet indicates that the first network device is reachable. For example, the fourth packet may be a keepalive packet. In addition, the first network device may further determine that the state machine of the BGP peer relationship is switched from the open sent state to the open confirm state. In the open confirm state, the BGP state machine waits for a keepalive or notification message.

When the state machine of the BGP peer relationship is the open confirm state, before S102, the method 100 may include the following step: When the first network device determines that the first condition is met, the first network device determines that the state machine of the BGP peer relationship enters the idle state from the open confirm state, where the first condition may include: The first network device receives a notification packet sent by the second network device, where the notification packet indicates that the UDP manner between the first network device and the second network device is abnormal; or the first network device determines that an update packet or a keepalive packet sent by the second network device is not received after second preset duration when the BGP peer relationship between the first network device and the second network device enters the open confirm state. The second network device sending the notification packet to the first network device may be that the second network device needs to end a process of establishing the BGP peer relationship with the first network device, or the second network device needs to modify a configuration and then establish the BGP peer relationship with the first network device. The foregoing exception that the current BGP peer relationship establishment needs to be terminated may be described as "the second network device cannot establish the peer relationship with the second network device". That the first network device determines that no update packet or keepalive packet sent by the second network device is received after the second preset duration when the first network device enters the open confirm state may be implemented by using a timer 3. Duration of the timer 3 is the second preset duration. For example, the first network device includes the timer 3. When the state machine of the BGP peer relationship enters the open confirm state, the timer 3 with duration of 30 seconds is started. Before the timer 3 expires, if the first network device receives the update packet or the keepalive packet sent by the second network device, the timer 3 restarts. When the timer 3 expires, it is considered that the first network device meets the first condition, and the first network device determines that the state machine of the BGP peer relationship enters the idle state from the open confirm state.

In this implementation, the second packet in S102 may be an update packet or a keepalive packet, and the second packet indicates that the second network device is reachable.

During implementation, for example, S102 may include the following step: The first network device receives an update packet or a keepalive packet that is sent by the second network device in the UDP manner. Because the first network device and the second network device need to continuously confirm, by using the keepalive packet or the update packet, that each other is in a normal running state, after S102, the method 100 may further include the following step: In response to the update packet or the keepalive packet, the first network device restarts the timer 3.

Based on the foregoing two possible implementations, the first network device receives the second packet sent by the second network device, which provides a data basis for establishing the BGP peer relationship between the first network device and the second network device.

In implementation, for example, S103 may mean that the state machine of the BGP peer relationship is switched to the established state, where the established state indicates that the BGP peer relationship is established between the first network device and the second network device. In the established state, the BGP state machine can exchange an update packet, a notification packet, or a keepalive packet with the BGP peer.

When the BGP peer relationship between the first network device and the second network device is in the established state, a keepalive packet or an update packet needs to be continuously exchanged between the first network device and the second network device to confirm that each other is in a normal running state. Therefore, after S103, the method may further include the following step: The first network device sends a keepalive packet or an update packet to the second network device in the UDP manner, and starts the timer 3 in response to receiving, by the first network device, an update packet or a keepalive packet sent by the second network device. The first network device restarts the timer 3.

Duration of the timer 3 may be flexibly set. The duration of the timer 3 may be greater than an interval duration of sending the keepalive packet by the first network device. For example, if the interval of sending the keepalive packet by the first network device is 10 seconds, the duration of the timer 3 may be set to 30 seconds.

After the BGP peer relationship between the first network device and the second network device enters the established state, the first network device and the second network device may exchange routes by using the update packet. For example, the first network device receives a BGP update packet sent by the second network device, where the BGP update packet includes routing information advertised by the second network device to the first network device. In this case, the first network device may store a route corresponding to each piece of routing information.

In some possible implementations, after the BGP peer relationship between the first network device and the second network device enters the established state, the method 100 may further include: switching the state machine of the BGP peer relationship from the established state to the idle state when the first network device determines that a second condition is met. For example, the second condition may include the following: The first network device receives a notification packet sent by the second network device, where the notification packet indicates to break off the BGP peer relationship between the first network device and the second network device; or the first network device does not receive, within the second preset duration, an update packet or a keepalive packet sent by the second network device. A reason why the second network device sends the notification packet may be that the second network device needs to close the BGP peer relationship with the first network device or may be that the second network device needs to re-establish the BGP peer relationship with the first network device after updating a configuration. This is not limited in this embodiment. That the first network device does not receive, within fourth preset duration, the update packet or the keepalive packet sent by the second network device may be implemented by using the timer 3. The duration of the timer 3 is the fourth preset duration (which may also be referred to as second preset duration). For example, the first network device includes the timer 3. When the BGP peer relationship between the first network device and the second network device enters the established state and the first network device sends the keepalive packet to the second network device, the timer 3 whose duration is 30 seconds is started. If the first network device receives, before the timer 3 expires, the update packet or the keepalive packet sent by the second network device, and the timer 3 is restarted. If the timer 3 expires, it is considered that an exception occurs in the first network device, the second network device, or the connection between the first network device and the second network device. When the second condition is met, the state machine of the BGP peer relationship enters the idle state from the established state.

After establishing the BGP peer relationship, the first network device and the second network device exchange and store a related route. Therefore, after the state machine of the BGP peer relationship enters the idle state from the established state, to prepare for establishing the BGP peer next time, the method 100 may further include the following step: The first network device deletes a route related to the second network device. The first network device deleting the route related to the second network device means that the first network device deletes a first route corresponding to the routing information received from the second network device, and that the first network device deletes a state of a second route corresponding to routing information advertised by the first network device to the second network device in the established state. The first route and the second route are in a general sense. For example, the first route may be at least one route that is sent by the second network device and that is stored on the first network device, and the second route may be at least one route that is sent to the second network device and that is stored on the first network device.

It should be noted that, when the first network device determines that the state machine of the BGP peer relationship with the second network device enters the idle state from the established state, if a BGP peer relationship needs to be established between the first network device and the second network device, the method 100 may further include the following step: When determining that a fourth condition is met, the first network device performs S101 to S103 in the method 100, to establish the BGP peer relationship between the first network device and the second network device. The fourth condition may include the following: After the established state is switched to the idle state, preset first duration elapses, and the first network device completes deleting the route related to the second network device.

It can be understood that, according to the method 100, the first network device and the second network device can exchange packets in a UDP manner, to establish the BGP peer relationship between the first network device and the second network device. In this way, when the first network device needs to establish the BGP peer with the second network device, the TCP connection between the first network device and the second network device does not need to be first established by using a complex procedure, and the BGP peer relationship between the first network device and the second network device can be established by directly exchanging a few packets the UDP manner. This reduces resources required for establishing the BGP peer and improves efficiency of establishing the BGP peer.

Figure 7:
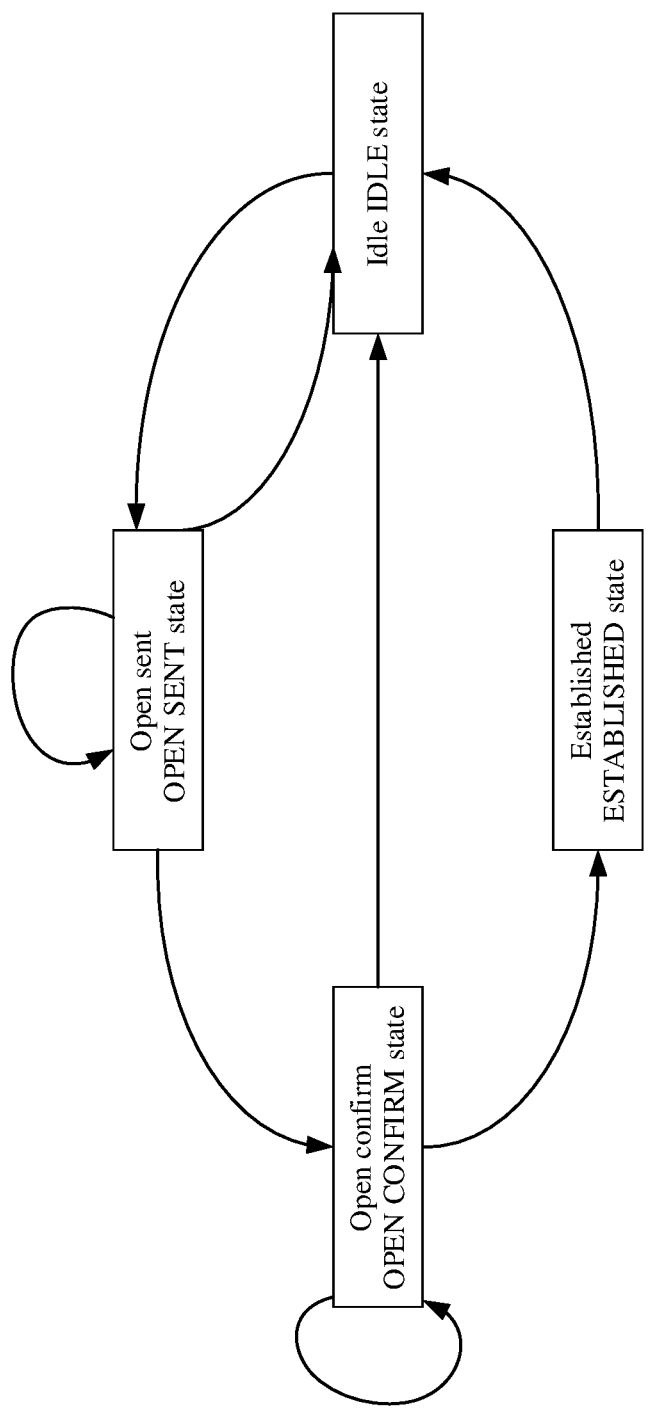
FIG. 7 is another schematic diagram of establishing a state machine of a BGP peer according to an embodiment.

To make the method for establishing a BGP peer provided in this embodiment more intuitive and clear, the following uses an example in which the first network device and the second network device include the state machine shown in FIG. 7, to assume, by using an example, a process of establishing a BGP peer relationship between the first network device and the second network device is used.

Figure 8:
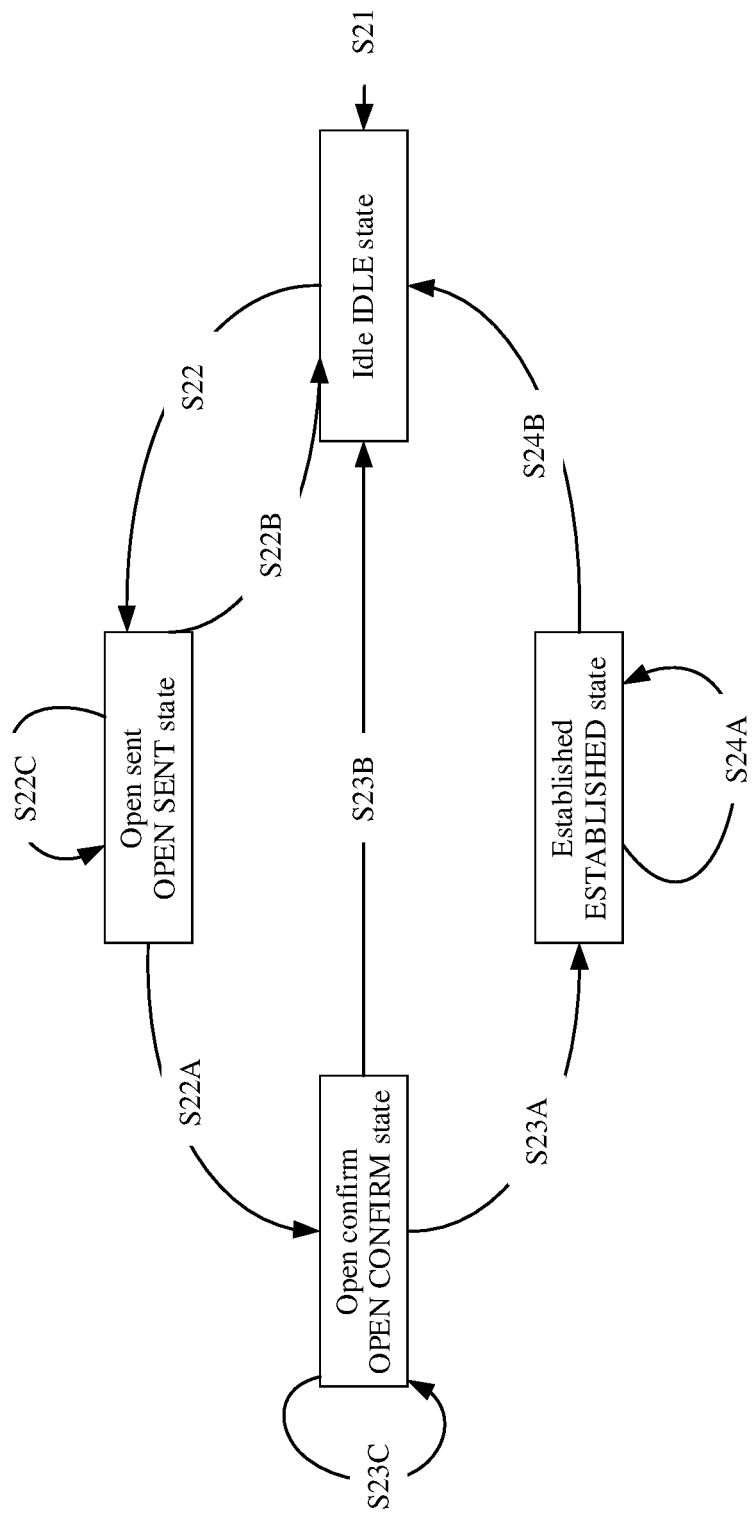
FIG. 8 is a schematic flowchart of an example of establishing a BGP peer according to an embodiment.

The scenario including the network device 11 and the network device 12 shown in FIG. 2 is still used as an example. It is assumed that a BGP peer needs to be established between the network device 11 and the network device 12. Because processing logic and processing procedures of the network device 11 and the network device 12 in each state are consistent, in FIG. 8, the network device 11 is used as an example to describe operations performed by each network device in a process of establishing the BGP peer relationship between the network device 11 and the network device 12 according to the method provided in this embodiment. As shown in FIG. 8, operations performed by the network device 11 when the network device 11 establishes a BGP peer with the second network device may include, for example, the following steps:

S21: The network device 11 completes BGP configuration, a state machine of the BGP peer relationship enters an idle state, and a timer 1 is started.

The completing BGP configuration may refer to configuring a BGP-related command, enabling a BGP function, and applying for a BGP resource, and may refer to configuring the network device 11 to establish the BGP peer relationship with the network device 12.

S22: From a moment when the timer 1 expires, the state machine of the BGP peer relationship enters an open sent state, a timer 2 is started, and the network device 11 sends an open packet 1 to the network device 12 in a UDP manner and starts to wait for receiving an open packet 2 sent by the network device 12 in the UDP manner. If an open packet 2 without an error is received, the state machine of the BGP peer relationship enters an open confirm state, and the following S23 (marked as S22A in the figure) is performed. If an open packet 2 with an error is received, a notification packet used to indicate that the BGP peer relationship between the network device 11 and the network device 12 is abnormal is sent to the network device 12 in the UDP manner, and back to an idle state (marked as S22B in the figure). If the timer 2 expires, an open packet 3 is sent to the network device 12 in the UDP manner, and the network device 11 starts to wait for receiving an open packet 4 sent by the network device 12 in the UDP manner, the timer 2 is restarted, and the open sent state is maintained (marked as S22C in the figure).

S23: When the state machine of the BGP peer relationship enters the open confirm state, the network device 11 sends a Keepalive packet 1 to the network device 12 in the UDP manner, starts a timer 3 (for example, 10 seconds), starts to wait for receiving a keepalive packet 2 or an Update packet sent by the network device 12, and resets a timer 4 (for example, 30 seconds). If the Keepalive packet 2 or the update packet is received before the timer 4 expires, the timer 4 is restarted, an established state is entered, and the following S24 (marked as S23A in the figure) is performed. If the timer 4 expires or a notification packet sent by the network device 12 is received, back to the idle state (marked as S23B in the figure). If the timer 3 expires, a keepalive packet 3 is sent to the network device 12 in the UDP manner, the timer 3 is restarted, and the open confirm state is maintained (marked as S23C in the figure).

S24: When the state machine of the BGP peer relationship enters the established state, it is determined that a BGP peer relationship is established between the network device 11 and the network device 12, and the network device 11 and the network device 12 may implement mutual route advertisement by using an update packet (marked as S24A in the figure); and after the established state is entered, if the network device 11 receives a notification packet indicating to close the BGP peer relationship or a notification packet indicating that the BGP peer relationship is abnormal, or the timer 4 expires, back to the idle state (marked as S24B in the figure).

It should be noted that, after the established state is entered, it may still be determined, by using the timer 4, that both the network device 11 and the network device 12 run normally. That is, before the timer 4 expires, at least one keepalive packet or update packet needs to be received from the network device 12, and the timer 4 is restarted when the keepalive packet or the update packet is received.

It can be understood that, compared with the six states included in the state machine of the network device in the process shown in FIG. 1 of establishing a BGP peer based on a TCP connection, for a network device that includes the state machine of the BGP peer relationship shown in FIG. 7, the connect state and the active state related to establishing the TCP connection between the network devices are reduced. In this way, the BGP peer establishment process provided in this embodiment involves fewer states, and the BGP peer establishment process is faster and more efficient. For an increasingly complex networking scenario, this greatly saves resources consumed by network deployment and improves network deployment efficiency.

Figure 9:
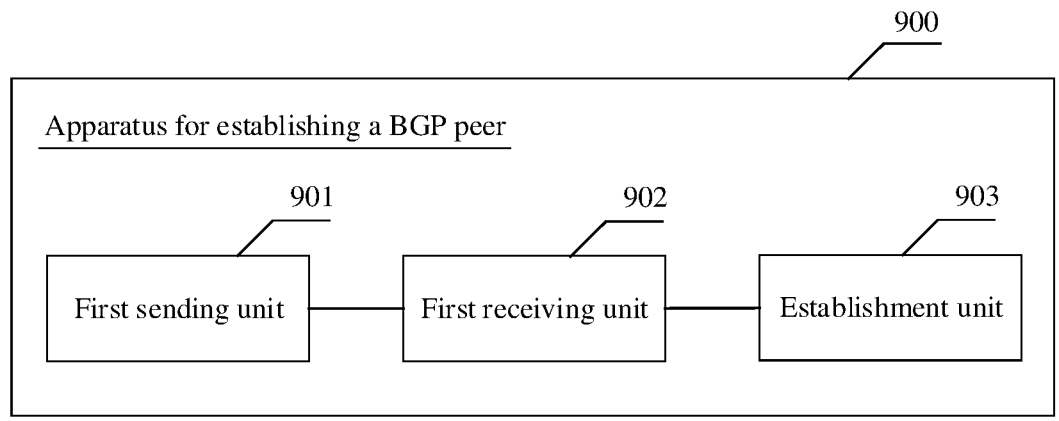
FIG. 9 is a schematic diagram of a structure of an apparatus 900 for establishing a BGP peer according to an embodiment.

Correspondingly, an embodiment may further provide an apparatus 900 for establishing a BGP peer. The apparatus 900 has any function of the first network device in the method embodiment shown in FIG. 4, FIG. 6, or FIG. 7, or the network device 11 in the method embodiment shown in FIG. 8. Refer to FIG. 9. The apparatus 900 may include a first sending unit 901, a first receiving unit 902, and an establishment unit 903.

The first sending unit 901 is configured to: send a first packet to a second network device in a UDP manner, where the first packet is used to establish a BGP peer with the second network device. The first sending unit 901 may perform S101 shown in FIG. 4.

The first receiving unit 902 is configured to receive a second packet sent by the second network device in the UDP manner, where the second packet is used to establish a BGP peer with the first network device. The first receiving unit 902 may perform S102 shown in FIG. 4.

The establishment unit 903 is configured to establish a BGP peer relationship with the second network device in response to receiving the second packet. The establishment unit 903 may perform S103 shown in FIG. 4.

In a possible implementation, the first packet is an open packet, and the open packet includes an autonomous system (AS) identifier to which the apparatus for establishing a BGP peer belongs and a BGP identifier of the apparatus for establishing a BGP peer.

In an example, the apparatus 900 may include a state machine of the BGP peer relationship, and the apparatus 900 further includes a setting unit and a first switching unit. The setting unit is configured to set the state machine to an idle state before the first packet is sent to the second network device in the UDP manner; and the first switching unit is configured to switch the state machine from the idle state to an OPEN SENT state after the first packet is sent to the second network device in the UDP manner.

As another example, the apparatus 900 includes a state machine of the BGP peer relationship, and the apparatus 900 further includes a first switching unit. The first switching unit is configured to switch the state machine from an idle state to an open sent state before the first packet is sent to the second network device in the UDP manner.

As still another example, the apparatus 900 includes a state machine of the BGP peer relationship, and the apparatus 900 further includes a first switching unit. The first switching unit is configured to switch the state machine from an idle state to an open sent state when the first packet is sent to the second network device in the UDP manner.

In a possible implementation, the apparatus 900 further includes a second sending unit. The second sending unit is configured to: after the first packet is sent to the second network device in the UDP manner, if no reply packet that is sent by the second network device and that is for the first packet is received within first preset duration, send an open packet to the second network device in the UDP manner.

In a possible implementation, the apparatus 900 further includes a second receiving unit and a determining unit. The second receiving unit is configured to: after the first packet is sent to the second network device in the UDP manner, receive a third packet sent by the second network device in the UDP manner, where the third packet is used to establish a BGP peer relationship with the apparatus 900 for establishing a BGP peer. The determining unit is configured to determine whether the third packet is correct, where that the third packet is correct means that a capability that is supported by the second network device and that is indicated by the third packet and a capability that is supported by the apparatus 900 for establishing a BGP peer and that is indicated by the first packet have common content.

The third packet is an open packet.

In a possible implementation, the apparatus 900 further includes a fourth sending unit. The fourth sending unit is configured to: send a fourth packet to the second network device in the UDP manner when the third packet is correct, where the fourth packet indicates that the apparatus 900 for establishing a BGP peer is reachable.

The fourth packet is a Keepalive packet.

In a possible implementation, the apparatus 900 includes a state machine of the BGP peer relationship, and the apparatus 900 further includes a second switching unit. The second switching unit is configured to: when the third packet is correct, switch the state machine from the open sent state to an OPEN CONFIRM state.

In a possible implementation, the apparatus 900 further includes a third switching unit. The third switching unit is configured to: before the second packet is received, switch the state machine from an open confirm state to the idle state when a first condition is met. The first condition includes the following: The apparatus 900 for establishing a BGP peer receives a first Notification packet, where the first notification packet indicates that the second network device cannot establish a peer relationship with the apparatus 900 for establishing a BGP peer, or the apparatus 900 for establishing a BGP peer does not receive a keepalive packet or an Update packet sent by the second network device within second preset duration.

In a possible implementation, the apparatus 900 includes a timer, duration of the timer is the second preset duration, and the apparatus 900 further includes a first restarting unit. The first restarting unit is configured to restart the timer by the apparatus 900 for establishing a BGP peer in response to receiving the second packet.

In a possible implementation, the apparatus 900 includes a state machine, and the apparatus 900 further includes a fourth switching unit. The fourth switching unit is configured to switch the state machine from the open sent state to the idle state when the third packet has an error.

In a possible implementation, the apparatus 900 further includes a fifth sending unit. The fifth sending unit is configured to: send a second Notification packet to the second network device when the third packet has an error, where the second notification packet indicates that the apparatus 900 for establishing a BGP peer cannot establish a BGP peer relationship with the second network device.

The second packet indicates that the second network device is reachable, and the second packet is a keepalive packet or an Update packet.

Alternatively, the second packet indicates that the second network device is reachable, and the second packet is an open packet or an Update packet.

As an example, the determining unit of the apparatus 900 is further configured to: before the BGP peer relationship with the second network device is established, determine whether the second packet is correct, where that the second packet is correct means that a capability that is supported by the second network device and that is indicated by the second packet and a capability that is supported by the first network device and that is indicated by the first packet have matching content. In this case, when the determining unit determines that the second packet is correct, the establishment unit is triggered to establish the BGP peer relationship with the second network device in response to receiving the second packet. When the determining unit determines that the second packet has an error, a fifth switching unit of the apparatus is configured to switch the state machine from the open sent state to the idle state.

In a possible implementation, the apparatus 900 further includes a fifth switching unit. The fifth switching unit is configured to: before the second packet is received, switch the state machine from the open sent state to the idle state when a first condition is met. The first condition includes the following: The apparatus 900 for establishing a BGP peer receives a first Notification packet, where the first notification packet indicates that the second network device cannot establish a peer relationship with the apparatus 900 for establishing a BGP peer; or the apparatus 900 for establishing a BGP peer does not receive, within third preset duration, an open packet or an Update packet sent by the second network device.

In a possible implementation, the apparatus 900 includes a timer, duration of the timer is the third preset duration, and the apparatus 900 further includes a second restarting unit. The second restarting unit is configured to restart the timer in response to receiving the second packet.

In a possible implementation, the apparatus 900 includes a state machine of the BGP peer relationship. In this case, the establishment unit 903 may be configured to switch the state machine to an ESTABLISHED state, where the established state indicates that the BGP peer relationship is established between the apparatus 900 for establishing a BGP peer and the second network device.

In a possible implementation, the apparatus 900 further includes a third receiving unit. The third receiving unit is configured to: after the BGP peer relationship with the second network device is established, receive a BGP Update packet sent by the second network device, where the BGP update packet includes routing information advertised by the second network device to the apparatus 900 for establishing a BGP peer.

In a possible implementation, the apparatus 900 further includes a sixth switching unit. The sixth switching unit is configured to: after the state machine is switched to the established state, switch the state machine from the established state to the idle state when a second condition is met.

The second condition includes the following: The apparatus 900 for establishing a BGP peer receives a second notification packet, where the second notification packet indicates to break off the BGP peer relationship between the apparatus 900 for establishing a BGP peer and the second network device; or the apparatus 900 for establishing a BGP peer does not receive, within fourth preset duration, an update packet or a keepalive packet sent by the second network device.

In a possible implementation, the apparatus 900 further includes a deleting unit. The deletion unit is configured to: after the idle state is entered from the established state, delete a route corresponding to the routing information received from the second network device.

It should be noted that the foregoing units having a same function but different sequence numbers in names may be units that can implement the function. For example, the first sending unit 901 and the second sending unit may be a same unit having a sending function.

It should be noted that the apparatus 900 for establishing a BGP peer shown in FIG. 8 may be the first network device in the embodiment shown in FIG. 4 or the network device 11 in the example shown in FIG. 8. Therefore, for various embodiments of the apparatus 900 for establishing a BGP peer, refer to the method 100 corresponding to FIG. 4 and related descriptions of the method corresponding to FIG. 8. Details are not described in this embodiment again.

Figure 10:
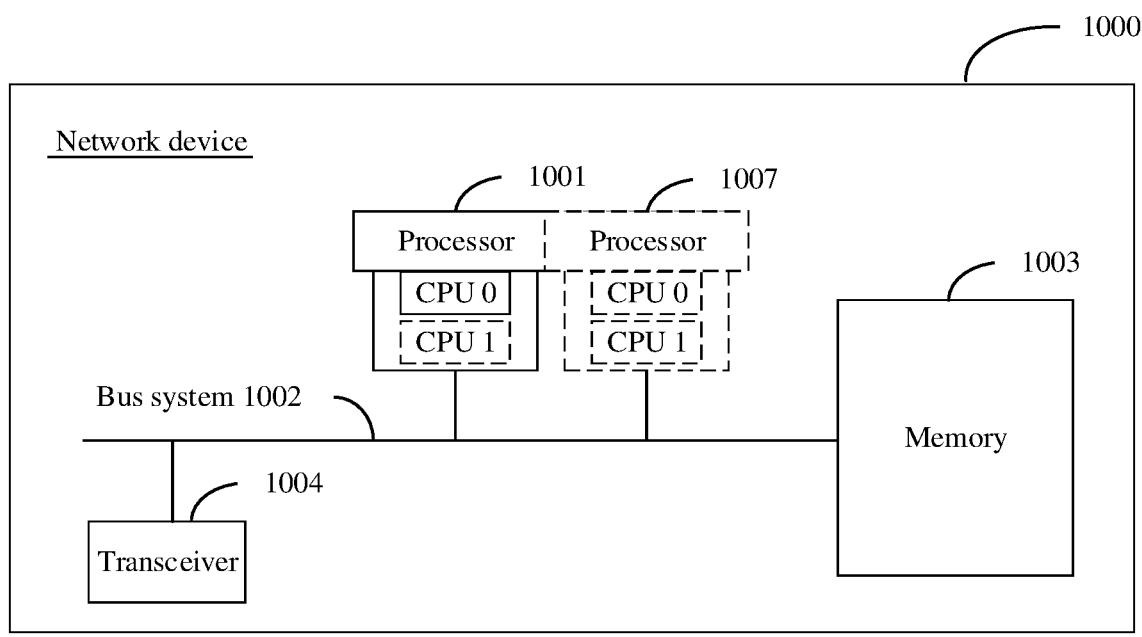
FIG. 10 is a schematic diagram of a structure of a network device 1000 according to an embodiment.

As shown in FIG. 10, an embodiment may provide a network device 1000. The network device 1000 may be the network device in any one of the foregoing embodiments, for example, may be the first network device in the embodiment shown in FIG. 4, FIG. 6, or FIG. 7, or may be the network device 11 in the embodiment shown in FIG. 8. The network device 1000 may implement a function of the first network device or the network device 11 in the foregoing embodiments. The network device 1000 includes at least one processor 1001, a bus system 1002, a memory 1003, and at least one transceiver 1004.

The network device 1000 may be an apparatus of a hardware structure and may be configured to implement function modules in the apparatus 900 for establishing a BGP peer shown in FIG. 9. For example, a person skilled in the art may figure out that the establishment unit 903 in the apparatus 900 for establishing a BGP peer shown in FIG. 9 may be implemented by the at least one processor 1001 by invoking code in the memory 1003, and the first sending unit 901 and the first receiving unit 902 in the apparatus 900 for establishing a BGP peer shown in FIG. 9 may be implemented by the transceiver 1004.

Optionally, the network device 1000 may be further configured to implement a function of the network device in any one of the foregoing embodiments.

Optionally, the processor 1001 may be a general-purpose central processing unit (CPU), a network processor (NP), a microprocessor, an application-specific integrated circuit (ASIC), or one or more integrated circuits configured to control program execution.

The bus system 1002 may include a path for transmitting information between the foregoing components.

The transceiver 1004 is configured to communicate with another device or a communication network.

The memory 1003 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory 1003 is not limited thereto. The memory may exist independently and may be connected to the processor through the bus. The memory may alternatively be integrated with the processor.

The memory 1003 is configured to store application program code for performing the solutions, and the processor 1001 controls the execution. The processor 1001 is configured to execute the application program code stored in the memory 1003, to implement a function in the method in this patent.

During implementation, in an embodiment, the processor 1001 may include one or more CPUs, for example, a CPU 0 and a CPU 1 in FIG. 10.

In an implementation, in an embodiment, the network device 1000 may include a plurality of processors, for example, the processor 1001 and a processor 1007 in FIG. 10. Each of the processors may be a single-core (single-CPU) processor or may be a multi-core (multi-CPU) processor. The processor herein may be one or more devices, circuits, and/or processing cores configured to process data (for example, computer program instructions).

Figure 11:
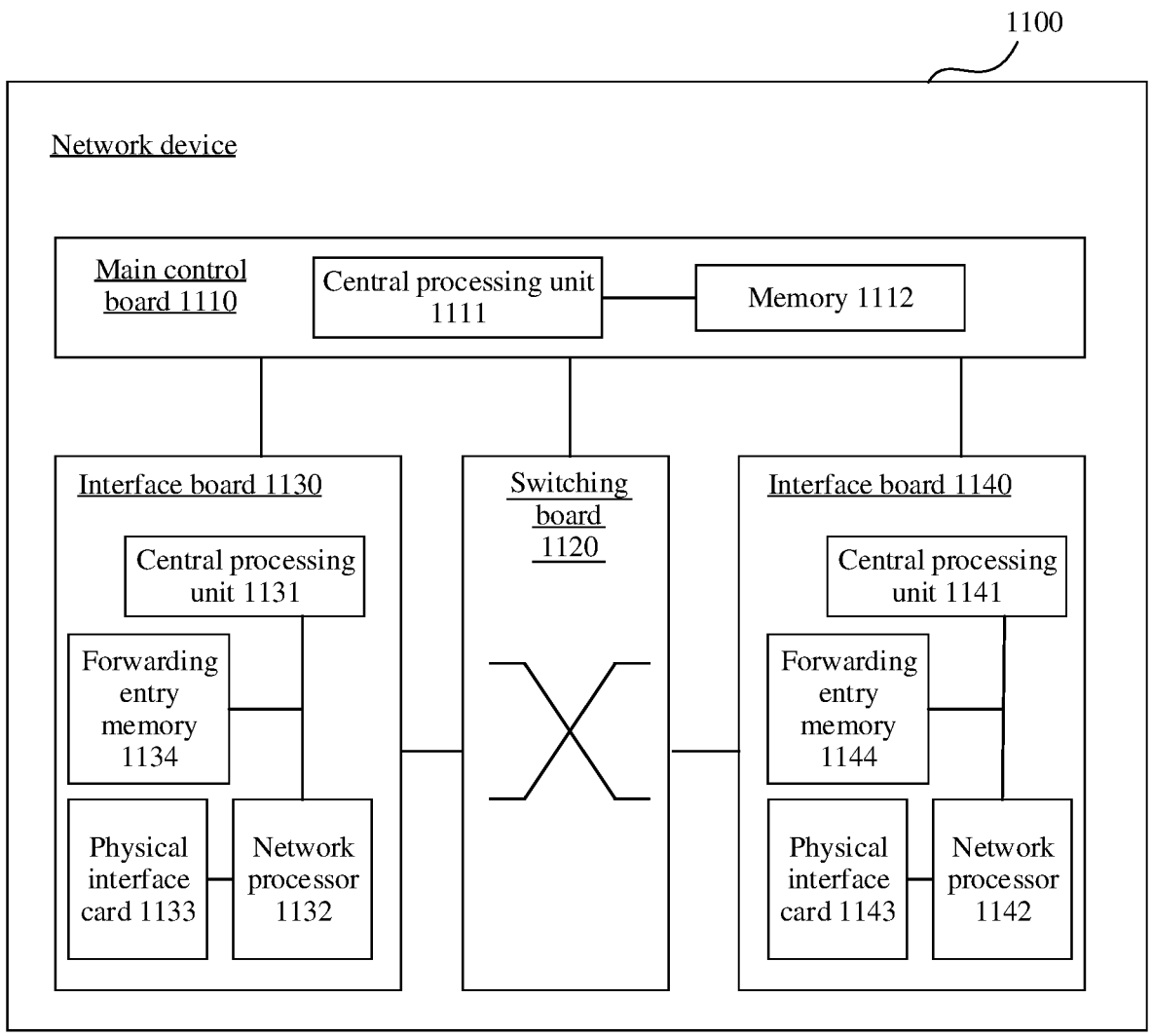
FIG. 11 is a schematic diagram of a structure of a network device 1100 according to an embodiment.

FIG. 11 is a schematic diagram of a structure of another network device 1100 according to an embodiment. For example, the network device 1100 may be the network device 11 in the embodiment shown in FIG. 2 or may be the first network device in the embodiment shown in FIG. 4.

The network device 1100 includes a main control board 1110 and an interface board 1130.

The main control board 1110 is also referred to as a main processing unit (MPU) or a route processor card. The main control board 1110 controls and manages components in the network device 1100, including route computation, device management, device maintenance, and protocol processing functions. The main control board 1110 includes a central processing unit 1111 and a memory 1112.

The interface board 1130 is also referred to as a line processing unit (LPU), a line card, or a service board. The interface board 1130 is configured to: provide various service interfaces and forward a data packet. The service interface includes but is not limited to an Ethernet interface, a POS (Packet over SONET/SDH) interface, and the like. The Ethernet interface is, for example, a flexible Ethernet service interface (FlexE Clients). The interface board 1130 includes a central processing unit 1131, a network processor 1132, a forwarding entry memory 1134, and a physical interface card (PIC) 1133.

The central processing unit 1131 on the interface board 1130 is configured to: control and manage the interface board 1130 and communicate with the central processing unit 1111 on the main control board 1110.

The network processor 1132 is configured to implement packet forwarding processing. A form of the network processor 1132 may be a forwarding chip. Processing on an uplink packet may include processing at a packet ingress interface and forwarding table lookup and processing on a downlink packet may include forwarding table lookup and the like.

The physical interface card 1133 is configured to implement a physical layer interconnection function. Original traffic enters the interface board 1130 from the physical interface card, and a processed packet is sent from the physical interface card 1133. The physical interface card 1133 includes at least one physical interface, and the physical interface is also referred to as a physical port. The physical interface card 1133 corresponds to a FlexE physical interface in a system architecture. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, the central processing unit 1131 of the interface board 1130 may alternatively perform a function of the network processor 1132, for example, implement software forwarding based on a general-purpose CPU. Therefore, the network processor 1132 is not necessary in the physical interface card 1133.

Optionally, the network device 1100 includes a plurality of interface boards. For example, the network device 1100 further includes an interface board 1140. The interface board 1140 includes a central processing unit 1141, a network processor 1142, a forwarding entry memory 1144, and a physical interface card 1143.

Optionally, the network device 1100 further includes a switching board 1120. The switching board 1120 may also be referred to as a switch fabric unit (SFU). When the network device has a plurality of interface boards 1130, the switching board 1120 is configured to complete data exchange between the interface boards. For example, the interface board 1130 and the interface board 1140 may communicate with each other by using the switching board 1120.

The main control board 1110 is coupled to the interface board 1130. For example, the main control board 1110, the interface board 1130, the interface board 1140, and the switching board 1120 are connected to a system backboard through a system bus for interworking. In a possible implementation, an inter-process communication (IPC) channel is established between the main control board 1110 and the interface board 1130, and the main control board 1110 and the interface board 1130 communicate with each other through the IPC channel.

Logically, the network device 1100 includes a control plane and a forwarding plane. The control plane includes the main control board 1110 and the central processing unit 1131. The forwarding plane includes components used for forwarding, for example, the forwarding entry memory 1134, the physical interface card 1133, and the network processor 1132. The control plane performs functions such as routing, generating a forwarding table, processing signaling and a protocol packet, and configuring and maintaining a device status. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated and may not be on a same device.

If the network device 1100 is configured as a first network device, the network processor 1132 may trigger the physical interface card 1133 to send a first packet to a second network device in the UDP manner and may receive a second packet sent by the second network device in the UDP manner. The central processing unit 1111 may establish a BGP peer relationship between the first network device and the second network device in response to receiving the second packet.

It should be understood that the first sending unit 901, the first receiving unit 902, and the like in the apparatus 900 for establishing a BGP relationship, and the transceiver 1004 in the network device 1000 may be equivalent to the physical interface card 1133 or the physical interface card 1143 in the network device 1100; and the establishment unit 903 and the like in the apparatus 900 for establishing a BGP relationship, and the processor 1001 in the network device 1000 may be equivalent to the central processing unit 1111 or the central processing unit 1131 in the network device 1100.

It can be understood that operations performed on the interface board 1140 are consistent with operations performed on the interface board 1130 in this embodiment. For brevity, details are not described again. It should be understood that the network device 1100 in this embodiment may correspond to the apparatus for establishing a BGP peer or the network device in the foregoing method embodiments. The main control board 1110, the interface board 1130, and/or the interface board 1140 in the network device 1100 may implement the functions and/or the steps implemented in the apparatus 900 for establishing a BGP peer or the network device 1000 in the foregoing method embodiments. For brevity, details are not described herein again.

There may be one or more main control boards. When there is a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. There may be no switching board and functions of the interface board and the main control board may be integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. An architecture that is to be used may depend on a networking deployment scenario.

In some possible embodiments, the foregoing network devices or network devices may be implemented as virtualized devices. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as each network device in FIG. 1. For example, each network device or network device may be implemented based on a general-purpose physical server in combination with a network functions virtualization (NFV) technology. Each network device or network device is a virtual host, a virtual router, or a virtual switch. With reference to the NFV technology, a person skilled in the art may obtain, through virtualization on the general-purpose physical server, the network devices or the network devices having the foregoing functions. Details are not described herein again.

It should be understood that the network devices in the foregoing product forms separately have any function of the network devices or the network devices in the foregoing method embodiments, and details are not described herein again.

An embodiment may further provide a chip, including a processor and an interface circuit. The interface circuit is configured to receive instructions and transmit the instructions to the processor. The processor may be, for example, an implementation form of the apparatus for establishing a BGP peer in the embodiments and may be configured to perform the foregoing method for establishing a BGP peer. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor or may be disposed separately from the processor. This is not limited. For example, the memory may be a non-transitory processor, for example, a read-only memory ROM. The memory and the processor may be integrated into a same chip or may be separately disposed on different chips. A type of the memory and a manner of disposing the memory and the processor are not limited.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device PLD), or another integrated chip.

Figures 12, 13:
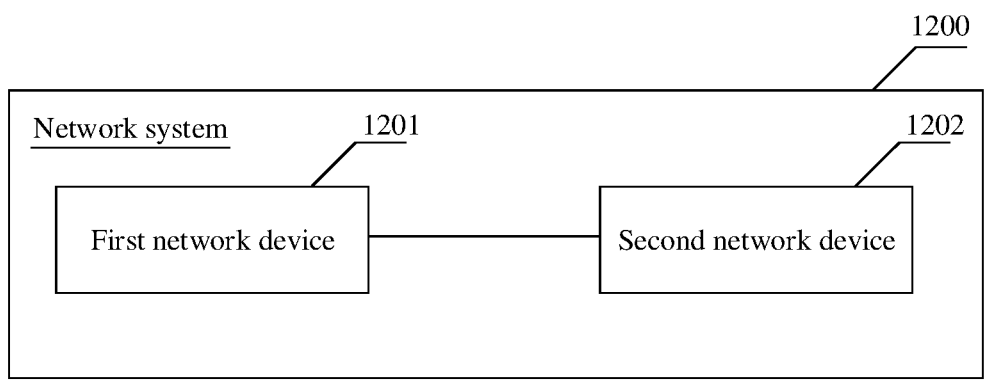
FIG. 12 is a schematic diagram of a structure of a network system 1200 according to an embodiment.
FIG. 13 is a schematic diagram of a structure of an open packet according to an embodiment.

In addition, an embodiment may further provide a network system 1200. Refer to FIG. 12. The network system 1200 may include a first network device 1201 and a second network device 1202. The first network device 1201 is configured to send a first packet to the second network device 1202 in a UDP manner, where the first packet is used to establish a BGP peer with the second network device 1202. The second network device 1202 is configured to: receive the first packet and send a second packet to the first network device 1201 in the UDP manner, where the second packet is used to establish a BGP peer with the first network device 1201. In this case, the first network device 1201 is further configured to: establish a BGP peer relationship with the second network device 1202 in response to receiving the second packet.

The first packet may be an open packet, and the open packet includes an identifier of an AS to which the first network device belongs and a BGP identifier of the first network device.

In a possible implementation, the first network device 1201 stores a state machine of the BGP peer relationship, and before the first network device 1201 sends the first packet to the second network device 1202 in the UDP manner, the state machine is in an idle state. In an example, the first network device 1201 is further configured to: switch the state machine from the idle state to an OPEN SENT state after sending the first packet to the second network device 1202 in the UDP manner. As another example, the first network device 1201 is further configured to: send the first packet to the second network device 1202 in the UDP manner after switching the state machine from the idle state to the open sent state. As still another example, the first network device 1201 is further configured to: switch the state machine from the idle state to the open sent state when sending the first packet to the second network device 1202 in the UDP manner.

In a possible implementation, the second packet indicates that the second network device 1202 is reachable, and the second packet may be, for example, a keepalive packet or an Update packet.

In a possible implementation, the first network device 1201 is further configured to: after sending the first packet to the second network device 1202 in the UDP manner, start to wait for receiving an open packet sent by the second network device 1202. If the first network device 1201 is further configured to receive, within the first preset duration, no reply packet that is for the first packet and that is sent by the second network device 1202, the first network device 1201 continues to send an open packet to the second network device 1202 in the UDP manner until the first network device 1201 receives a reply packet sent by the second network device 1202 in the UDP manner.

In a possible implementation, the first network device 1201 is further configured to: after sending the first packet to the second network device 1202 in the UDP manner, receive a third packet sent by the second network device 1202 in the UDP manner, where the third packet is used to establish a BGP peer relationship with the first network device 1201; and the first network device 1201 is further configured to determine whether the third packet is correct, where that the third packet is correct means that a capability that is supported by the second network device 1202 and that is indicated by the third packet and a capability that is supported by the first network device 1201 and that is indicated by the first packet have common content. The third packet may be an open packet.

As an example, when the third packet is correct, the first network device 1201 is further configured to send a fourth packet to the second network device 1202 in the UDP manner, where the fourth packet indicates that the first network device 1201 is reachable. The fourth packet may be, for example, a Keepalive packet. When it is determined that the third packet is correct, the first network device 1201 is further configured to switch the state machine from the open sent state to an OPEN CONFIRM state.

In this example, the first network device 1201 is further configured to: before receiving the second packet, if it is determined that a first condition is met, switch the state machine from an open confirm state to the idle state. The first condition includes the following: The first network device 1201 receives a first Notification packet, where the first notification packet indicates that the second network device 1202 cannot establish a peer relationship with the first network device 1201; or the first network device 1201 does not receive, within second preset duration, a keepalive packet or an Update packet sent by the second network device 1202.

In this example, the first network device 1201 may include a timer, and duration of the timer may be the second preset duration. In this case, the first network device 1201 is further configured to restart the timer in response to the received second packet.

As another example, when the third packet has an error, the first network device 1201 is further configured to switch the state machine from the open sent state to the idle state. In addition, when the third packet has an error, the first network device 1201 is further configured to send a second Notification packet to the second network device 1202, where the second notification packet indicates that the first network device 1201 cannot establish a BGP peer relationship with the second network device 1202.

In a possible implementation, the second packet may be, for example, an open packet or an Update packet.

As an example, the first network device is further configured to: in response to receiving the second packet, before establishing the BGP peer relationship with the second network device 1202, determine whether the second packet is correct. That the second packet is correct means that a capability that is indicated by the second packet and that is supported by the second network device 1202 and a capability that is indicated by the first packet and that is supported by the first network device 1201 have matching content. In this case, when it is determined that the second packet is correct, the first network device 1201 is further configured to establish the BGP peer relationship with the second network device 1202 in response to receiving the second packet. When it is determined that the second packet has an error, the first network device 1201 is further configured to switch the state machine from the open sent state to the idle state.

As an example, the first network device 1201 is further configured to: before receiving the second packet, if it is determined that a first condition is met, switch the state machine from the open sent state to the idle state. The first condition includes the following: The first network device 1201 receives a first Notification packet, where the first notification packet indicates that the second network device 1202 cannot establish a peer relationship with the first network device 1201; or the first network device 1201 does not receive, within third preset duration, an open packet or an Update packet sent by the second network device 1202. In this example, the first network device 1201 may include a timer, and duration of the timer may be the third preset duration. In this case, the first network device 1201 is further configured to restart the timer in response to receiving the second packet.

In some possible implementations, if the first network device 1201 stores the state machine of the BGP peer relationship, that the first network device 1201 establishes the BGP peer relationship with the second network device 1202 in response to the second packet may be as follows: The first network device 1201 switches the state machine to an ESTABLISHED state, where the established state indicates that the BGP peer relationship is established between the first network device 1201 and the second network device 1202.

As an example, the first network device 1201 is further configured to: after establishing the BGP peer relationship with the second network device 1202, keep receiving BGP Update packets sent by the second network device 1202, where the BGP update packet includes routing information advertised by the second network device 1202 to the first network device 1201.

In some possible implementations, the first network device 1201 is further configured to: after switching the state machine into the established state, if a second condition is met, switch the state machine from the established state to the idle state. The second condition may include, for example, the following: The first network device 1201 receives a second notification packet, where the second notification packet indicates to break off the BGP peer relationship between the first network device 1201 and the second network device 1202; or the first network device 1201 does not receive, within fourth preset duration, an update packet or a keepalive packet sent by the second network device 1202.

In an example, the first network device 1201 is further configured to: after the idle state is entered from the established state, delete a route corresponding to the routing information received from the second network device 1202. In addition, the first network device 1201 is further configured to delete a state of a route corresponding to routing information sent by the first network device 1201 to the second network device 1202.

It should be noted that, in the network system 1200, the second network device 1202 is configured to send a fifth packet to the first network device 1201 in a UDP manner, where the fifth packet is used to establish a BGP peer with the first network device; and the first network device 1201 is configured to receive the fifth packet and send a sixth packet to the second network device 1202 in the UDP manner, where the sixth packet is used to establish a BGP peer with the second network device 1202. In this case, the second network device 1202 is further configured to establish a BGP peer relationship with the first network device 1201 in response to receiving the sixth packet.

It should be noted that for related descriptions of the network system 1200 shown in FIG. 12, refer to related descriptions of the method 100 corresponding to FIG. 4 and the method corresponding to FIG. 8. Details are not described in this embodiment again.

In addition, an embodiment may further provide a non-transitory computer-readable storage medium. The non-transitory computer-readable storage medium stores program code or instructions. When the program code or the instructions are run on a computer, the computer is enabled to perform the method in any one of the implementations in the foregoing embodiment shown in FIG. 4 or FIG. 8.

In addition, an embodiment may further provide a computer program product. When the computer program product runs on a computer, the computer performs the method in any one of the implementations of the foregoing method 100.

"First" in the terms such as "first packet" and "first network device" mentioned in the embodiments is merely used as a name identifier and does not mean being the first in a sequence. This rule is also applicable to "second" and the like.

It should be understood that "determining B based on the based on A" mentioned in the embodiments does not mean that B is determined only based on A, and B may be further determined based on A and/or other information.

From the foregoing descriptions of the implementations, a person skilled in the art may clearly understand that some or all steps of the methods in embodiments may be implemented by software in addition to a universal hardware platform. Based on such an understanding, the solutions may be implemented in a form of a software product. The computer software product may be stored in a storage medium, for example, a read-only memory (ROM), a RAM, a magnetic disk, or a compact disc, and includes several instructions for instructing a computer device (which may be a personal computer, a server, or a network communication device such as a router) to perform the methods described in embodiments or some parts of the embodiments.

The embodiments are described in a progressive manner. For same or similar parts in embodiments, refer to these embodiments. Each embodiment focuses on a difference from other embodiments. System and device embodiments may be similar to the method embodiments and therefore are described briefly. For related parts, refer to partial descriptions in the method embodiments. The described device and system embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of embodiments. A person of ordinary skill in the art may understand and implement the embodiments without creative efforts.

The foregoing descriptions are merely implementations of embodiments, but are not intended as limiting. It should be noted that a person of ordinary skill in the art may make some improvements and polishing without departing from the embodiments and the improvements and polishing shall fall within the scope of the embodiments as well.

What is claimed is:

1. A method for establishing a border gateway protocol (BGP) peer, comprising:
    sending, by a first network device, a first packet to a second network device in a user datagram protocol (UDP) manner, wherein the first packet is used to establish the BGP peer with the second network device;
    receiving, by the first network device, a second packet sent by the second network device in the UDP manner, wherein the second packet is used to establish the BGP peer with the first network device; and
    establishing, by the first network device, a BGP peer relationship with the second network device in response to receiving the second packet by using an idle state and an open sent state, wherein the idle state and the open sent state in the first network device are two consecutive states in a state machine of the BGP peer relationship.

2. The method according to claim 1, wherein the first packet is an open packet, and the open packet comprises an identifier of an autonomous system (AS) to which the first network device belongs and a BGP identifier of the first network device.

3. The method according to claim 1, wherein the first network device stores the state machine of the BGP peer relationship, the state machine is in the idle state before the first network device sends the first packet to the second network device in the UDP manner, and after the sending, by the first network device, the first packet to the second network device in the UDP manner, the method further comprises:

switching, by the first network device, the state machine from the idle state to the open sent state.

4. The method according to claim 1, wherein the first network device stores a state machine of the BGP peer relationship, and before the sending, by the first network device, the first packet to the second network device in the UDP manner, the method further comprises:
switching, by the first network device, the state machine from the idle state to the open sent state.

5. The method according to claim 1, wherein the first network device stores a state machine of the BGP peer relationship, and the method further comprises:
switching, by the first network device, the state machine from the idle state to the open sent state when sending the first packet to the second network device in the UDP manner.

6. The method according to claim 1, wherein after the sending, by the first network device, the first packet to the second network device in the UDP manner, the method further comprises:
sending, by the first network device, an open packet to the second network device in the UDP manner when no reply packet that is for the first packet and that is sent by the second network device is received within first preset duration.

7. The method according to claim 1, wherein the second packet is a Keepalive packet, and the second packet indicates that the second network device is reachable.

8. The method according to claim 1, wherein after the sending, by the first network device, the first packet to the second network device in the UDP manner, the method further comprises:
receiving, by the first network device, a third packet sent by the second network device in the UDP manner, wherein the third packet is used to establish a BGP peer relationship with the first network device; and
determining, by the first network device, whether the third packet is correct, wherein that the third packet is correct means that a capability that is supported by the second network device and that is indicated by the third packet and a capability that is supported by the first network device and that is indicated by the first packet have matching content.

9. The method according to claim 1, wherein the second packet is an open packet.

10. A network device, comprising:
at least one processor;
one or more memories coupled to the at least one processor and storing programming instructions, wherein the at least one processor is configured to execute the programming instructions to cause the network device to:
send a first packet to a second network device in a user datagram protocol (UDP) manner, wherein the first packet is used to establish a border gateway protocol (BGP) peer with the second network device;
receive a second packet sent by the second network device in the UDP manner, wherein the second packet is used to establish a BGP peer with the first network device; and
establish a BGP peer relationship with the second network device in response to receiving the second packet by using an idle state and an open sent state, wherein the idle state and the open sent state in the first network device are two consecutive states in a state machine of the BGP peer relationship.

11. The network device according to claim 10, wherein the first packet is an open packet, and the open packet comprises an identifier of an autonomous system (AS) to which the first network device belongs and a BGP identifier of the first network device.

12. The network device according to claim 10, wherein the first network device stores the state machine of the BGP peer relationship, the state machine is in the idle state before the first network device sends the first packet to the second network device in the UDP manner, and wherein the programming instructions, when executed by the at least one processor, further cause the network device to:
switch the state machine from the idle state to the open sent state.

13. The network device according to claim 10, wherein the first network device stores the state machine of the BGP peer relationship, and wherein the programming instructions, when executed by the at least one processor, further cause the network device to:
switch the state machine from the idle state to the open sent state.

14. The network device according to claim 10, wherein the first network device stores the state machine of the BGP peer relationship, and wherein the programming instructions, when executed by the at least one processor, further cause the network device to:
switch the state machine from the idle state to the open sent state when sending the first packet to the second network device in the UDP manner.

15. The network device according to claim 10, wherein the programming instructions, when executed by the at least one processor, further cause the network device to:
send an open packet to the second network device in the UDP manner when no reply packet that is for the first packet and that is sent by the second network device is received within first preset duration.

16. The network device according to claim 10, wherein the second packet is a Keepalive packet, and the second packet indicates that the second network device is reachable.

17. The network device according to claim 10, wherein the programming instructions, when executed by the at least one processor, further cause the network device to:
receive a third packet sent by the second network device in the UDP manner, wherein the third packet is used to establish a BGP peer relationship with the first network device; and
determine whether the third packet is correct, wherein that the third packet is correct means that a capability that is supported by the second network device and that is indicated by the third packet and a capability that is supported by the first network device and that is indicated by the first packet have matching content.

18. The network device according to claim 10, wherein the second packet is an open packet.

19. A network system comprising a first network device and a second network device, wherein the network device is configured to:
send a first packet to the second network device in a user datagram protocol (UDP) manner, wherein the first packet is used to establish a border gateway protocol (BGP) peer with the second network device;
receive a second packet sent by the second network device in the UDP manner, wherein the second packet is used to establish a BGP peer with the first network device; and
establish a BGP peer relationship with the second network device in response to receiving the second packet by using an idle state and an open sent state, wherein the idle state and the open sent state in the first network device are two consecutive states in a state machine of the BGP peer relationship.

20. The network system according to claim 19, wherein the first packet is an open packet, and the open packet comprises an identifier of an autonomous system (AS) to which the first network device belongs and a BGP identifier of the first network device.

* * * * *